(12) United States Patent  (10) Patent No.: US 9,313,209 B2
Corr et al.  (45) Date of Patent: *Apr. 12, 2016

(54) LOAN ORIGINATION SOFTWARE SYSTEM FOR PROCESSING MORTGAGE LOANS OVER A DISTRIBUTED NETWORK

(71) Applicant: Ellie Mae, Inc., Pleasanton, CA (US)

(72) Inventors: Jonathan H. Corr, Danville, CA (US); Limin Hu, Fremont, CA (US); Tsu-Wang Chen, Fremont, CA (US)

(73) Assignee: Ellie Mae, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,197

(22) Filed: Mar. 23, 2015

(65) Prior Publication Data

US 2015/0262292 A1  Sep. 17, 2015

Related U.S. Application Data

(63) Continuation of application No. 10/884,766, filed on Jul. 2, 2004, now Pat. No. 8,990,254.

(51) Int. Cl.
*G06F 17/30* (2006.01)
*H04L 29/06* (2006.01)
*G06Q 40/02* (2012.01)
*G06F 3/0484* (2013.01)

(52) U.S. Cl.
CPC .......... *H04L 63/104* (2013.01); *G06F 3/04842* (2013.01); *G06Q 40/02* (2013.01); *G06Q 40/025* (2013.01); *H04L 63/083* (2013.01); *H04L 67/42* (2013.01)

(58) Field of Classification Search
USPC ................................................. 707/790, 805
See application file for complete search history.

(56) References Cited

U.S. PATENT DOCUMENTS

| | | | |
|---|---|---|---|
| 5,091,868 A | 2/1992 | Pickens et al. |
| 5,111,185 A | 5/1992 | Kozaki |
| 5,144,693 A | 9/1992 | Morgan |
| 5,148,520 A | 9/1992 | Morgan |
| 5,191,525 A | 3/1993 | LeBrun et al. |
| 5,226,137 A | 7/1993 | Bolan et al. |
| 5,438,657 A | 8/1995 | Nakatani |
| 5,563,783 A | 10/1996 | Stolfo et al. |
| 5,581,700 A | 12/1996 | Witte |
| 5,611,052 A | 3/1997 | Dykstra et al. |
| 5,699,527 A | 12/1997 | Davidson |

(Continued)

FOREIGN PATENT DOCUMENTS

WO  WO 00/21011  4/2000

OTHER PUBLICATIONS

Contour Software, Inc.—The Loan Closer for Windows—Version 4.0 (1984-1998).

(Continued)

*Primary Examiner* — Kim Nguyen
(74) *Attorney, Agent, or Firm* — Fish & Richardson P.C.

(57) ABSTRACT

A loan origination and processing system is described. The system can reside on a server computer that is coupled to a data store storing data related to a borrower. The server computer is further coupled to a brokerage network that comprises a loan officer client, a loan processor client, and a broker manager client. Each brokerage client computer executes a unique interface to the loan origination and processing system.

24 Claims, 18 Drawing Sheets

(56) References Cited

U.S. PATENT DOCUMENTS

| | | |
|---|---|---|
| 5,704,029 A | 12/1997 | Wright, Jr. |
| 5,734,898 A | 3/1998 | He |
| 5,752,042 A | 5/1998 | Cole et al. |
| 5,765,144 A | 6/1998 | Larche et al. |
| 5,768,510 A | 6/1998 | Gish |
| 5,774,551 A | 6/1998 | Wu et al. |
| 5,812,764 A | 9/1998 | Heinz, Sr. |
| 5,913,029 A | 6/1999 | Shostak |
| 5,919,247 A | 7/1999 | Van Hoff et al. |
| 5,940,812 A | 8/1999 | Tengel et al. |
| 5,963,952 A | 10/1999 | Smith |
| 5,995,947 A | 11/1999 | Fraser et al. |
| 5,995,985 A | 11/1999 | Cai |
| 6,000,033 A | 12/1999 | Kelley et al. |
| 6,006,242 A | 12/1999 | Poole et al. |
| 6,006,334 A | 12/1999 | Nguyen et al. |
| 6,023,714 A | 2/2000 | Hill et al. |
| 6,029,149 A | 2/2000 | Dykstra et al. |
| 6,078,403 A | 6/2000 | Palmer |
| 6,081,893 A | 6/2000 | Grawrock et al. |
| 6,088,700 A | 7/2000 | Larsen et al. |
| 6,088,796 A | 7/2000 | Cianfrocca et al. |
| 6,092,121 A | 7/2000 | Bennett et al. |
| 6,101,510 A | 8/2000 | Stone et al. |
| 6,104,394 A | 8/2000 | Lisle et al. |
| 6,128,602 A | 10/2000 | Northington et al. |
| 6,154,751 A | 11/2000 | Ault et al. |
| 6,157,953 A | 12/2000 | Chang et al. |
| 6,175,926 B1 | 1/2001 | Fogle |
| 6,202,206 B1 | 3/2001 | Dean et al. |
| 6,208,979 B1 | 3/2001 | Sinclair |
| 6,209,095 B1 | 3/2001 | Anderson et al. |
| 6,226,623 B1 | 5/2001 | Schein et al. |
| 6,233,566 B1 | 5/2001 | Levine et al. |
| 6,233,582 B1 | 5/2001 | Traversat et al. |
| 6,266,716 B1 | 7/2001 | Wilson et al. |
| 6,282,658 B2 | 8/2001 | French et al. |
| 6,321,339 B1 | 11/2001 | French et al. |
| 6,324,524 B1 | 11/2001 | Lent et al. |
| 6,324,648 B1 | 11/2001 | Grantges, Jr. |
| 6,336,124 B1 | 1/2002 | Alam et al. |
| 6,338,064 B1 | 1/2002 | Ault et al. |
| 6,339,828 B1 | 1/2002 | Grawrock et al. |
| 6,341,351 B1 | 1/2002 | Muralidhran et al. |
| 6,351,776 B1 | 2/2002 | O'Brien et al. |
| 6,363,391 B1 | 3/2002 | Rosensteel, Jr. |
| 6,366,912 B1 | 4/2002 | Wallent et al. |
| 6,385,655 B1 | 5/2002 | Smith et al. |
| 6,397,337 B1 | 5/2002 | Garrett et al. |
| 6,418,448 B1 | 7/2002 | Sarkar |
| 6,424,968 B1 | 7/2002 | Broster et al. |
| 6,438,526 B1 | 8/2002 | Dykes et al. |
| 6,446,141 B1 | 9/2002 | Nolan et al. |
| 6,469,714 B2 | 10/2002 | Buxton et al. |
| 6,473,892 B1 | 10/2002 | Porter |
| 6,476,828 B1 | 11/2002 | Burket et al. |
| 6,476,833 B1 | 11/2002 | Moshfeghi |
| 6,477,537 B2 | 11/2002 | Gustman |
| 6,493,871 B1 | 12/2002 | McGuire et al. |
| 6,496,936 B1 | 12/2002 | French et al. |
| 6,504,554 B1 | 1/2003 | Stone et al. |
| 6,538,669 B1 | 3/2003 | Lagueux, Jr. et al. |
| 6,553,408 B1 | 4/2003 | Merrell et al. |
| 6,608,634 B1 | 8/2003 | Sherrard et al. |
| 6,611,816 B2 | 8/2003 | Lebda et al. |
| 6,615,405 B1 | 9/2003 | Goldman et al. |
| 6,640,278 B1 | 10/2003 | Nolan et al. |
| 6,662,340 B2 | 12/2003 | Rawat et al. |
| 6,851,087 B1 | 2/2005 | Sibert |
| 6,859,878 B1 | 2/2005 | Kerr et al. |
| 6,904,412 B1 | 6/2005 | Broadbent et al. |
| 6,920,434 B1 | 7/2005 | Cossette |
| 6,947,943 B2 | 9/2005 | DeAnna et al. |
| 6,988,082 B1 | 1/2006 | Williams et al. |
| 7,058,971 B1 | 6/2006 | Horikiri |
| 7,103,650 B1 | 9/2006 | Vetrivelkumaran et al. |
| 7,155,490 B1 | 12/2006 | Malmer et al. |
| 7,165,250 B2 | 1/2007 | Lyons |
| 7,185,333 B1 | 2/2007 | Shafron |
| 7,263,663 B2 | 8/2007 | Ballard et al. |
| 7,340,714 B2 | 3/2008 | Upton |
| 7,343,348 B2 | 3/2008 | McAvoy et al. |
| 7,379,965 B2 | 5/2008 | Sherwood et al. |
| 7,392,210 B1* | 6/2008 | MacKay ............ G06Q 10/06 705/35 |
| 7,404,203 B2 | 7/2008 | Ng |
| 7,444,302 B2 | 10/2008 | Hu et al. |
| 7,461,395 B2 | 12/2008 | Ng |
| 7,472,089 B2 | 12/2008 | Hu et al. |
| 7,788,489 B2 | 8/2010 | Ng |
| 8,019,881 B2 | 9/2011 | Sandhu et al. |
| 8,117,117 B2 | 2/2012 | Hu et al. |
| 8,126,920 B2 | 2/2012 | Hu et al. |
| 8,364,579 B2 | 1/2013 | Hu et al. |
| 8,510,818 B2 | 8/2013 | Garg et al. |
| 8,600,798 B1 | 12/2013 | Corr et al. |
| 8,612,590 B1 | 12/2013 | Chaddha et al. |
| 8,762,357 B2 | 6/2014 | Hu et al. |
| 2001/0010046 A1 | 7/2001 | Muyres et al. |
| 2001/0011246 A1 | 8/2001 | Tammaro |
| 2001/0029482 A1 | 10/2001 | Tealdi et al. |
| 2001/0032178 A1 | 10/2001 | Adams et al. |
| 2001/0037288 A1 | 11/2001 | Bennett et al. |
| 2001/0039516 A1 | 11/2001 | Bennett et al. |
| 2001/0047307 A1 | 11/2001 | Bennett et al. |
| 2001/0047326 A1 | 11/2001 | Broadbent et al. |
| 2001/0049653 A1 | 12/2001 | Sheets |
| 2002/0019804 A1 | 2/2002 | Sutton |
| 2002/0029188 A1 | 3/2002 | Schmid |
| 2002/0059137 A1 | 5/2002 | Freeman et al. |
| 2002/0065879 A1 | 5/2002 | Ambrose et al. |
| 2002/0138414 A1 | 9/2002 | Baker, IV |
| 2002/0169650 A1* | 11/2002 | Dougherty ............ G06Q 30/02 705/38 |
| 2002/0188941 A1 | 12/2002 | Cicciarelli et al. |
| 2002/0194219 A1 | 12/2002 | Bradley et al. |
| 2003/0018558 A1* | 1/2003 | Heffner ................ G06Q 40/02 705/37 |
| 2003/0033241 A1 | 2/2003 | Harrari |
| 2003/0036994 A1* | 2/2003 | Witzig ................ G06Q 10/10 705/38 |
| 2003/0046586 A1 | 3/2003 | Bheemarasetti et al. |
| 2003/0061398 A1 | 3/2003 | Wilson et al. |
| 2003/0065614 A1 | 4/2003 | Sweeney |
| 2003/0066065 A1 | 4/2003 | Larkin |
| 2003/0159136 A1 | 8/2003 | Huang et al. |
| 2003/0163598 A1 | 8/2003 | Wilson et al. |
| 2003/0184585 A1 | 10/2003 | Xu |
| 2003/0210428 A1 | 11/2003 | Bevlin et al. |
| 2003/0220879 A1* | 11/2003 | Gaughan ............ G06Q 40/02 705/51 |
| 2003/0229581 A1* | 12/2003 | Green ................ G06Q 10/10 705/38 |
| 2003/0233316 A1 | 12/2003 | Hu et al. |
| 2004/0019558 A1 | 1/2004 | McDonald et al. |
| 2004/0034592 A1* | 2/2004 | Hu ..................... G06Q 40/00 705/38 |
| 2004/0064402 A1* | 4/2004 | Dreyer ................ G06Q 40/00 705/38 |
| 2004/0088700 A1 | 5/2004 | Lee et al. |
| 2004/0138996 A1 | 7/2004 | Bettenburg et al. |
| 2004/0158746 A1 | 8/2004 | Hu et al. |
| 2004/0225596 A1* | 11/2004 | Kemper ............ G06Q 20/382 705/38 |
| 2004/0250120 A1 | 12/2004 | Ng |
| 2005/0172271 A1 | 8/2005 | Spertus et al. |
| 2005/0187937 A1 | 8/2005 | Kawabe et al. |
| 2005/0197953 A1 | 9/2005 | Broadbent et al. |
| 2005/0208461 A1 | 9/2005 | Krebs et al. |
| 2005/0235202 A1 | 10/2005 | Chen et al. |
| 2005/0278249 A1 | 12/2005 | Jones et al. |
| 2005/0289046 A1 | 12/2005 | Conyack, Jr. |
| 2006/0004651 A1 | 1/2006 | Corr et al. |
| 2006/0005036 A1 | 1/2006 | Hu et al. |

(56) References Cited

U.S. PATENT DOCUMENTS

| | | |
|---|---|---|
| 2006/0059422 A1 | 3/2006 | Wu et al. |
| 2006/0069753 A1 | 3/2006 | Hu et al. |
| 2006/0075070 A1 | 4/2006 | Merissert-Coffinieres et al. |
| 2006/0101023 A1 | 5/2006 | Han et al. |
| 2006/0101453 A1 | 5/2006 | Burkhart et al. |
| 2006/0155639 A1 | 7/2006 | Lynch et al. |
| 2006/0178983 A1 | 8/2006 | Nice et al. |
| 2006/0184452 A1* | 8/2006 | Barnes ............ G06Q 40/00 705/50 |
| 2006/0248003 A1 | 11/2006 | Basin et al. |
| 2007/0168278 A1 | 7/2007 | Peterson et al. |
| 2009/0055309 A1 | 2/2009 | Hu et al. |
| 2011/0231907 A1 | 9/2011 | Smith |
| 2012/0143748 A1 | 6/2012 | Hu et al. |
| 2012/0158787 A1 | 6/2012 | Hu et al. |
| 2013/0179328 A1 | 7/2013 | Hu et al. |
| 2014/0373105 A1 | 12/2014 | Hu et al. |

OTHER PUBLICATIONS

Contour Software, Inc.—The Loan Handler—Version 5.0 (1984-2001).
Ilium Software eWallet Users Guide and Reference Version 4.0 by Ilium Software, Inc. © 1997-2006.
Calyx Software, "Point for Windows Version 3.x Interface Development Guide," Nov. 29, 1999, pp. 1-21.
Calyx Software, "Point for Windows Version 3.x Interface Marketing Guide," Dec. 8, 1999, pp. 1-5.
LOS Documentation—Genesis (2001).
LOS Documentation—Calyx (Revised Aug. 2002).
Calyx Point—Getting Started (2002).
Calyx Point—Point User Guide (Revised May 2002).
LOS Documentation—Byte (2003).
Calyx Point—Point User Guide (Revised Oct. 2003).
Calyx Point and PointMan—Getting Started (Updated May 2003).
Calyx Point and PointMan—Getting Started (Updated Oct. 2003).
LOS Documentation—Genesis (2003).
Understanding Client-Server Applications, Parts I and II, zone.ni.com, Feb. 19, 2004.
A Gentle Introduction to SGML, isgmlug.org, Apr. 14, 2004.
Overview of SGML Resources, W3.org., Apr. 14, 2004.
Application Service Provider, Webopedia, May 6, 2004.
How ASPs Work, howstuffworks.com, Jul. 1, 2004.
Defining an Internet ASP, howstuffworks.com, Jul. 1, 2004.
Examples of ASPs, howstuffworks.com, Jul. 1, 2004.
How ASPs Work, Things to Ask a Prospective ASP, howstuffworks.com, Jul. 1, 2004.
User's Guide to Gator eWallet Version 7.x, published by Gain Publishing (no publication date known).
Using MS Message Queue Triggers, Bradley Holland, consulting.dthomas.co.uk, date unknown.
Mguill, "Genesis 2000 TechNet" Internet Publication, (Online) Jan. 28, 2003. Retrieved from the Internet: URL:http://www.genesis2000.com/support/index3.asp.
Calyx Point—Getting Started (Updated Aug. 2002).
Gator eWallet—The Smart Online Companion, Feb. 24, 2006 (2 pages). Retrieved from the Internet: URL:http://www.gator.com/home2.html.
Gator eWallet—Frequently Asked Questions, Feb. 24, 2006 (11 pages). Retrieved from the Internet: URL:http://www.gator.com/help/gatorfaq.html.
Point Installation (PN 801000-000737) (2 pages).
Byte User Guide. Version 4.8, CBC Companies: Nov. 2003.
"IFAP—Dear Partner, Colleague Letters," [online] [Retrieved on Jul. 23, 2013]; Retrieved from the Internet URL: http://www.ifap.ed.gov/dpcletters/doc0350_bodyoftext.htm; 3 pages.
"Ellie Mae Breaks Ground with Dynamic Loan Screening, the Industry's First Loan Matching System," [online] [Retrieved on Jul. 23, 2013]; Retrieved from the Internet URL: http://www.elliemae.com/ellie-mae-breaks-ground-with-dynamic-loan-screening-the-industrys-first-loan-matching-system/; 5 pages.

* cited by examiner

FIG. 5

EMLITE - LOCAL

LOANS | ePASS | CONTACTS | NEWS | DASHBOARD | SETTINGS | REPORTS | MESSAGES | INBOX | NEW LOAN | SIGNOUT

LOG    ADD

GREENE, CAILEAN    SAVE    BACK TO PIPELINE    29 DAYS REMAINING    LOAN#: EM00000000-AP — 508

FILE STARTED  3/14/04

LOAN AMOUNT: $75,000
LTV: 22% / 78% DTI: 16% / 84%    RATE: 7.25%    — 502    LP: PAIGE JOHANSON  LO: BRUCE WALSH

LOAN APPLICATION

TRANSACTION DETAILS

- ☐ PURCHASES        ☐ CONSTRUCTION
- ☐ CASH-OUT REFI    ☐ CONSTRUCTION - PERM
- ☐ NO CASH-OUT REFI ☐ OTHER

LOAN TYPE      LIEN POSITION       AMORTIZATION TYPE
- ☑ CONV       ☐ FIRST             ☐ FIXED RATE       [LENDER]
- ☐ FHA        ☐ SECOND            ☐ GPM - RATE [ ] % [ ] YEARS   [LOAN PROGRAM]
- ☐ VA                             ☐ ARM -                         [CLOSING COST]
- ☐ FMHA                           ☐ OTHER -
- ☐ OTHER -

PURCHASE PRICE    $ 102,000
DOWN PAYMENT      [ ] %
LOAN AMOUNT       $ 82,000.00                                [ZOOM]

NOTE RATE   7.500 %
                                                    QUAL RATE   [ ] %
                                                    TERM        180 MTHS

— 504

FORMS  TOOLS   PRINT

1003
TRUTH IN LENDING
GOOD FAITH ESTIMATE
TRANSMITTAL SUMMARY

EMLITE

LOANS | ePASS | SETTINGS | REPORTS

INBOX | NEW LOAN | SIGNOUT | CALC | HELP

CURRENT FOLDER ▽

SEARCH
BORROWER'S NAME ▷ GO
OR
LOAN PROCESSOR ▷ GO
PAIGE JOHNSON ▷

ADVANCED SEARCH

SORT BY:
ALERTS
OR MILESTONES:

RECENT FILES
GAFFERSON, JONATHAN
WU, TING
ARCHER, CAREY

WELCOME, PAIGE — 902
2 FILES WITH ALERTS

☐ WAITE, DEVA  LO: EMILY DICKENSON  LOAN#: EM0000000000-0234  PROCESSING  SUBMITTAL DATE
  144 65TH ST.                                                 3/3/04         5 DAYS 3/10/04   5 DAYS

☐ GAFFERSON, LO: EMILY DICKENSON  LOAN#: EM0000000000-0123  PROCESSING  SUBMITTAL DATE
  JONATHAN
  2001 SEN ST.                                                TODAY          5 DAYS 3/12/04   90 DAYS

93 OTHER FILES:

☐ ANDERSON,  ORIGINATOR:                                    FUNDED         CLOSING DATE
  JEFFERSON  BETH YOURMANZ                                  3/3/04         1 DAYS 3/4/04    90 DAYS

MOVE | TRANSFER

| ⊞ ENCOMPASS-SERVER MODE | | | | | | | _ ☐ × |
|---|---|---|---|---|---|---|---|
| LOANS | ePASS | CONTACTS | NEWS | DASHBOARD | SETTINGS | REPORTS | MESSAGES | INBOX | NEW LOAN | SIGNOUT |
| ⇐ ⇒ ⊗ 🏠 | PRINT | 🖩 POPULATE FORM | | | | | EXIT ePASS |

LOGO FANNIE MAE    TECHNOLOGY PARTNER LENDER    A FANNIE MAE DO SPONSORING LENDER
GUIDE TO UNDERWRITING WITH DESKTOP UNDERWRITER

| MY ePass | UNDERWRITING FINDINGS REPORT |
|---|---|
| WELCOME: JONATHAN BROKER | SUMMARY |
| UNDERWRITING     EXIT | RECOMMENDATION           REFER/ELIGIBLE |
| • FANNIE MAE DO FOR ePASS | PRIMARY BORROWER         KEN  CUSTOMER       CO-BORROWER |
| • GE - AU CENTRAL | LENDER LOAN NUMBER       99-0280              CASEFILE ID         635342300 |
|  | UNDERWRITING RUN DATE    07/01/2003            SUBMITTED BY        T0094DNS |
| LENDERS       EXIT | MORTGAGE INFORMATION |
| • AAMES DIRECT | LTC/CLTV                 85.00%/85.00%        NOTE RATE           6.000% |
| • INDYMAC BANK | HOUSING EXPENSE RATIO    25.96%               LOAN TYPE           CONVENTIONAL |
| • NEW CENTURY MORTGAGE | TOTAL EXPENSE RATIO      25.96%               AMORTIZATION TYPE   FIXED RATE |
| • BANK OF AMERICA | TOTAL LOAN AMOUNT        $198900.00           LOAN PURPOSE        PURCHASE |
| CREDIT REPORTING  EXIT | SALES PRICE              $1234000.00          REFI PURPOSE |
|  | APPRAISED VALUE          $24500.00 |
| • CREDCO BY FIRST AMERICAN | PROPERTY INFORMATION |
| • FACTUAL DATA | ADDRESS      10655 BIRCH STREET              PROPERTY TYPE       ATTACHED |
| TITLE & CLOSING   EXIT |              BURBANK, CA 91502 |
| • FIRST AMERICAN TITLE | 1   THIS CASE HAS BEEN REFERRED TO AN UNDERWRITER FOR FURTHER REVIEW |
|  | 2   THIS CASE MEETS FANNIE MAE ELIGIBILITY REQUIREMENTS |
| EXIT MY ePASS | 3   THIS CASE HAS BEEN REFERRED DUE TO INADEQUATE FUNDS TO CLOSE |
| PASSWORD MANAGER | FINDINGS |
|  | 4   THE FOLLOWING ASPECTS OF THE BORROWER'S LOAN APPLICATION HAD A |

FIG. 11

| LOG | | |
|---|---|---|
| FILE STARTED | | 05/27/03 |
| CREDIT REPORT ORDERED | BL | 05/27/03 |
| PRINTED FORMS | BL | 05/27/03 |
| CALLED JOHN | BL | 05/27/03 |
| AU ORDERED | BL | 05/27/03 |
| SENT FORMS | BL | 05/28/03 |
| SUBMITTED | | 05/29/03 |
| LOCKED RATE | BL | 05/29/03 |
| CALLED JOHN | BL | 05/29/03 |
| ORDERED TITLE REPORT | BL | 05/29/03 |
| ORDERED APPRAISAL | BL | 05/29/03 |
| CALLED LO | BL | 05/30/03 |
| CALLED TITLE | BL | 05/30/03 |
| CALLED JOHN | BL | 05/30/03 |
| TITLE REPORT RECEIVED | BL | 05/31/03 |
| APPRAISAL RECEIVED | BL | 06/01/03 |
| APPROVED | | 06/02/03 |
| FLOOD REPORT ORDERED | BL | 06/02/03 |
| INSURANCE ORDERED | BL | 06/02/03 |
| CALLED JOHN | BL | 06/02/03 |
| CALLED LO | BL | 06/02/03 |
| CALLED LENDER | BL | 06/03/03 |
| DOC SIGNING | | 06/09/03 |
| CALLED JOHN | BL | 06/09/03 |
| CALLED LO | BL | 06/10/03 |
| CALLED TITLE | BL | 06/10/03 |
| ORDERED DOCS | BL | 06/10/03 |
| SENT FORMS | BL | 06/10/03 |
| FUNDED | | 06/11/03 |
| CALLED JOHN | BL | 06/11/03 |
| CALLED LO | BL | 06/11/03 |
| CLOSED | | 06/11/03 |

FIG. 13

| EMLITE – LOCAL | | | | | | | | _ □ × |
|---|---|---|---|---|---|---|---|---|
| LOANS | ePASS | CONTACTS | NEWS | DASHBOARD | SETTINGS | REPORTS | MESSAGES | INBOX | NEW LOAN | SIGNOUT |

| LOG | TRACKING | ADD | JACOMMON, CRISTA | SENT TO PROCESSING | | LTV: 95.745/95.745 |
|---|---|---|---|---|---|---|
| | | | | | | DEBT TO INCOME: 105.497/105.4 |

TRACKING WORKSHEET [NEW]

FILE STARTED 3/16/04
SENT TO PROCESSING 3/16/04

| SUBMITTAL DUE | 4/14/04 |
| APPROVAL DUE | 4/21/04 |
| DOC SIGNING DUE | 4/26/04 |
| FUNDING DUE | 7/01/04 |
| CLOSING DUE | 7/06/04 |

DOCUMENTS

| CREDIT REPORT | ORDERED: 05/27/76 | RECEIVED: 05/27/76 | EXPIRES: |
| CREDIT REPORT | ORDERED: | RECEIVED: | EXPIRES: |
| TITLE | ORDERED: | RECEIVED: | EXPIRES: |
| FLOOD | ORDERED: 05/27/76 | RECEIVED: | EXPIRES: |

VERIFICATIONS

| VOL - BANK A | ORDERED: 05/27/76 | RECEIVED: | EXPIRES: |
| VOD - BANK B | ORDERED: 05/27/76 | RECEIVED: | EXPIRES: |

FORMS [VERIFY] [TOOLS]

1003
TRUTH IN LENDING
GOOD FAITH ESTIMATE
TRANSMITTAL SUMMARY

FIG. 14

HISTORY

| EVENT TYPE | DESCRIPTION | DATE | CLICKABLE | RESULT |
|---|---|---|---|---|
| FIRST CONTACT | FIRST ENTRY INTO CONTACT MANAGER | DATE OF FIRST ENTRY | NO | |
| MAIL MERGE | ANY MAIL MERGE THAT INCLUDED THIS CONTACT AND APPLICATION CURRENT | DATE OF MAIL MERGE | YES | OPEN CUSTOM LETTER |
| EMAIL MERGE | ANY EMAIL MERGE THAT INCLUDED THIS CONTACT AND APPLICATION CURRENT | DATE OF EMAIL MERGE | YES | OPEN CUSTOM LETTER |
| FAX MERGE | ANY FAX MERGE THAT INCLUDED THIS CONTACT AND APPLICATION CURRENT | DATE OF FAX MERGE | YES | OPEN CUSTOM LETTER |
| TO DO | ANY TO DO CREATED WITH CURRENT APPLICATION | DATE OF TO DO | YES | GO TO TO DO IN MY CALENDAR |
| MEETING | ANY MEETING CREATED WITH CURRENT APPLICATION | DATE OF MEETING | YES | GO TO MEETING IN MY CALENDAR |
| CALL | ANY CALL SCHEDULED WITH CURRENT APPLICATION | DATE OF CALL | YES | GO TO CALL IN MY CALENDAR |
| CURRENT APPLICATION | ANY APPLICATION THAT IS CURRENTLY ACTIVE IN PIPELINE | DATE OF LOAN OPENED | YES | GO TO CURRENT LOAN IN PIPELINE |
| CLOSED LOAN | ANY LOANS CLOSED WITH CONTACT | DATE OF LOAN CLOSED | YES | VIEW LOAN DETAILS ON HISTORY PAGE |
| INACTIVE LOAN | ANY LOANS THAT DID NOT CLOSE BUT CURRENTLY NOT IN PIPELINE | DATE OF PUSH TO INACTIVE | YES | VIEW LOAN DETAILS ON HISTORY PAGE |

LOAN ORIGINATION SOFTWARE SYSTEM FOR PROCESSING MORTGAGE LOANS OVER A DISTRIBUTED NETWORK

CROSS-REFERENCE TO RELATED APPLICATION

This application is a continuation of U.S. application Ser. No. 10/884,766, filed on Jul. 2, 2004, the disclosure of which is hereby incorporated by reference in its entirety.

FIELD OF THE INVENTION

The present invention relates generally to loan origination system software, and more specifically, to a system for originating and processing mortgage loan applications over a distributed computer network that couples lenders, borrowers, and loan brokers in a comprehensive interface structure.

BACKGROUND OF THE INVENTION

The mortgage loan industry requires the interfacing of various different parties including borrowers, banks, brokers, and third party service providers. Throughout the loan submission and approval process, a core set of data, the borrower's loan application data, is examined and manipulated by various different people, with each one performing a different task. The advent of on-line services, and especially web-based systems, has led to the development of sophisticated programs, referred to as Loan Origination Software (LOS) systems, which are used by loan brokers to automate the loan application process and fulfillment process.

In a traditional loan application scenario, a borrower approaches a loan broker to find an appropriate loan. The broker takes the application information from the borrower and compiles the customary loan application papers. The loan origination process typically involves many different processing steps that are very detailed and data-specific, including pre-qualifying the borrower, generating loan documents, finding a lender, originating the loan, generating disclosure documents and reports, processing the loan and tracking the loan application through the final stages of underwriting and fulfillment. Various different people within the loan brokerage can be involved in each loan application, such as the loan officer who finds the appropriate loan for the borrower, the loan processor who coordinates the construction and finalization of the loan documents, and the manager who oversees the brokerage business. Each of these parties closely interacts with each other over the course of a loan application process. Each one also interacts with various outside parties, such as banks, financial institutions, underwriters, government sponsored entities, and various third party service providers and settlement service vendors.

Although present LOS systems allow brokers to automate certain processes, such as producing and populating loan forms, and keeping track of an applicant's financial information, typical loan origination software systems do not provide a comprehensive interface between loan officers and the other parties involved in the loan origination process, such as the loan processor and brokerage manager. Most present LOS programs are focused and adapted to perform online form processing tasks, and are not optimized to facilitate connectivity among the parties involved. As such, they are not able to provide true integration and management over the entire loan application and fulfillment process.

In general, present LOS systems are ill suited to the current format of brokerage operations and do not satisfactorily address real user needs. Current LOS systems are largely considered to be basic form generators and not true collaboration tools for processors and loan officers working on same basic set of data. Because most present LOS systems were designed almost exclusively for loan processors, true functionality for loan officers and brokerage managers is typically lacking, thereby providing little or no internal company-collaboration capabilities. Most present LOS systems also provide minimal networking functionality, thus disadvantaging branch offices and remote users, and hampering communication with lenders and service providers. Security is also often an issue with borrower loan data residing in plain data files, and the need to rely on non-secure communication and transmission media, such as fax and e-mail.

What is needed, therefore, is a loan origination software system that provides comprehensive intercommunication among the parties involved in a mortgage loan application, with functional interfaces for each of these parties.

What is further needed is a loan processing system that provides a centralized company database with secure, accurate, and timely data, and automated loan application management.

What is yet further needed is a loan processing system that provides secure, seamless network connectivity with outside parties, such as lenders and settlement service providers.

SUMMARY OF THE INVENTION

A loan origination software system for originating and processing mortgage loan applications over a distributed computer network is described. A loan broker computer system includes a loan origination software program integrated with a web-browser based interface system. The loan origination system includes a comprehensive electronic-form based process that automatically generates and populates documents required during the course of a mortgage loan application process. The loan origination system also includes an interface component that couples the loan origination software program to one or more partner computers. The partners comprise loan underwriters, lenders (such as banks and finance companies), and settlement service vendors (such as appraisers, insurance brokers, and credit agencies). The loan origination system resides on a server computer that is coupled to a loan brokerage that includes three types of users, such as loan officers, loan processors, and brokerage managers. The system includes three separate and unique interfaces for each type of user. The documents and data objects, comprising the loan application are stored as files in a central database stores the loan application files and file templates. Other items stored and associated with the loan application are document templates and administrative or business rules.

The user interfaces display the loan application files in a variety of different views. The system automatically guides the loan application process through the various events of the process and among the different users of the system. Interface filters and hierarchical controls limit the access and control of each type of user over the centralized data comprising the loan application.

The system includes automatic loan application tracking and event logging. Significant events or activities associated with a loan application are logged as the application is processed through the various application steps and passed among the users. Alerts can be associated with certain stages of the application to provide updated status indicators and advance warning of upcoming deadlines. The system also includes an integrated contact management module to facilitate marketing activities directed to known clients. The brokerage manager interface includes several report generating capabilities to compile statistics associated with individual users, loans, third party service providers, or clients.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which:

FIG. 5 is an exemplary screen shot for a loan application referenced in the interface page of FIG. 4;

FIG. 6 is an exemplary screen shot for a loan credit report interface, according to one embodiment of the present invention;

FIG. 8 illustrates an exemplary credit report returned from a credit reporting agency through the loan officer user interface;

FIG. 9 is an exemplary screen shot of the loan processor interface page, according to one embodiment of the present invention;

FIG. 10 is an exemplary screen shot of a text messaging page for the loan processor interface page, according to one embodiment of the present invention;

FIG. 11 is an exemplary screen shot of a loan underwriting findings report, according to one embodiment of the present invention;

FIG. 13 is an exemplary log page that lists several different log entries, according to one embodiment of the present invention;

FIG. 14 is an exemplary tracking worksheet that lists several different document and verification entries, according to one embodiment of the present invention;

FIG. 15 is a table that lists the events that are included within a history for client contacts;

FIG. 17 is an exemplary screen shot of a contact manager, according to one embodiment of the present invention.

DETAILED DESCRIPTION OF THE PREFERRED EMBODIMENT

Figure 1:
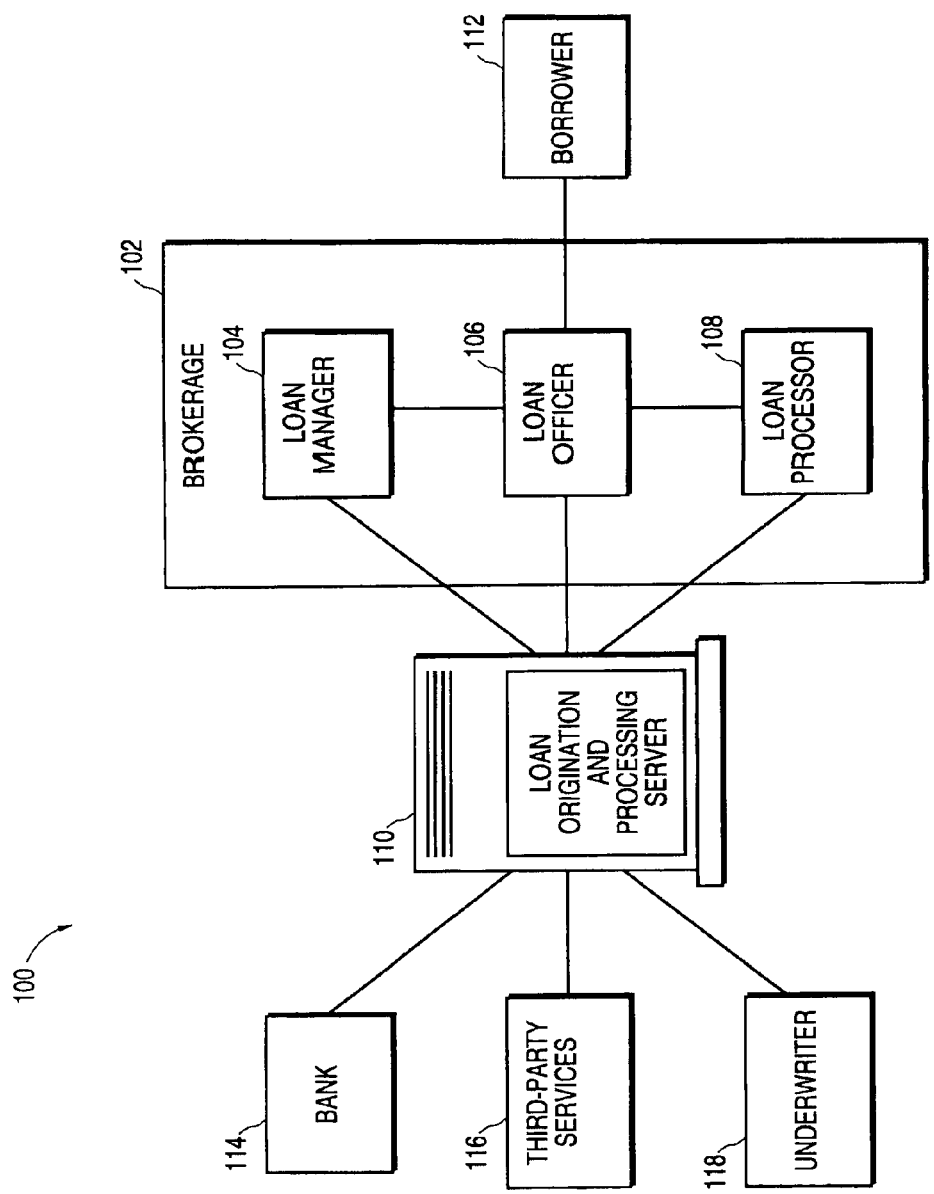
FIG. 1 illustrates a network that implements a loan processing software system, according to one embodiment of the present invention.

A comprehensive and integrated loan origination software system for use by people in a loan brokerage is disclosed. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or a fiber or copper-based telecommunications network. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers. In some instances, the client and server functionality may be implemented on a single computer platform.

Aspects of the present invention can be used in a distributed electronic commerce application that includes a client/server network system that links one or more server computers to one or more client computers, as well as server computers to other server computers and client computers to other client computers. The client and server computers may be implemented as desktop personal computers, workstation computers, mobile computers, portable computing devices, personal digital assistant (PDA) devices, or any other similar type of computing device.

In the loan application process, a broker matches a borrower (customer or client) with the loan package that best suits their need. Unlike the retail loan market, in which the borrower directly inquires about loans available from a bank or commercial lender, the loan broker utilizes the wholesale loan market. In terms of a general process, the broker obtains data from the borrower and then shops for loans from the available sources in the wholesale loan market. Wholesale lenders typically work only with brokers, and take completed loan packages and underwrite them. The brokers are typically offered discounted pricing in return for the processing work performed by the broker.

In a network embodiment of the present invention, a loan broker computer is configured to access computers operated by third parties (typically in the wholesale loan market), such as lenders, loan underwriters, funders, closers, settlement service vendors, and other similar loan fulfillment parties through a web based interface that is integrated with a loan origination software program. The loan origination and processing software provides an interface to those companies that will ultimately perform the loan services and provide the requested funds. During the course of the loan application process, various items of information are transmitted among the parties, including borrower information and loan application data. This information is typically maintained in databases stored in the broker computer, or on the third party computers. Different entities may be responsible for different aspects of the transaction from the lender's side. For example, one company may be involved in the processing of a loan application, while another is involved with providing the loan itself, while yet another may be involved with the billing and collection of repayment from the borrower.

The network implementation facilitates the delivery (transmission) and tracking of data and allows for the completion of electronic commerce transactions. Several different network topologies may be implemented through the use of a loan processing network system according to embodiments of the present invention. In general, the network system couples one or more lenders (banks, financial institutions, credit agencies and so on) to the loan brokers who act on behalf of potential borrowers. The loan brokers help borrowers to find and obtain loans by obtaining personal data from the borrower, searching for compatible loans from the various lenders, presenting loan selections to the borrower, and performing certain validation or screening tasks, such as pre-qualification of the borrower all through the networked interface that the loan origination and processing software provides. The loan brokers also directly interface with the parties that will fulfill the loan or provide settlement services, such as lenders, funders, loan underwriters, and settlement service vendors.

A broker typically keeps track of pending loans and customers through one or more pipelines. A pipeline generally refers to a list of all loans and/or borrowers that are committed and being processed by the broker. A separate pipeline, often referred to as a "pre-qualification pipeline" can be used to list prospective loans and/or borrowers who are not yet committed to a particular loan.

For purposes of the present discussion, a loan broker or loan originator is any person or entity that helps to procure a loan on behalf of a borrower, and can include correspondent brokers, small banks that provide brokerage services, and any other similar type of loan procurement company or retail originator. In general, a loan broker or brokerage firm comprises a team of people that perform tasks related to the origination, processing and fulfillment of a loan. Typically, a loan officer interfaces directly with the borrower and start the loan application process by taking the borrower's information and finding the appropriate loan. A loan processor then attends to the detail of assuring that the loan documents are filled out correctly and routed to the appropriate parties. A brokerage manager may oversee the entire process and manage the work of the officers and processors.

In the mortgage industry, loan brokers typically execute Loan Origination Software (LOS) programs to manage the origination tasks in the loan application process for a borrower. Most present LOS programs, especially those built to pre-Internet standards, implicitly assume that one person creates a mortgage and walks it through every step of the process. In reality, however, most mortgages are processed by teams of people who fulfill separate sales (loan officer), processing (loan processor), and management (brokerage manager) functions.

In one embodiment of the present invention, a processing and management system that automates the loan origination process provides an integration of loan origination software with tools and solutions customized to meet the separate needs of the loan officer, processor, and mortgage broker. The processing and management system facilitates the collaboration of these different parties with other and an array of lenders and suppliers to create optimal loans for clients with unique requirements. The system is provided in a comprehensive software program that interconnects an entire mortgage origination enterprise comprising the borrower, loan officer, processor, broker, lender, underwriter, and service provider.

In one embodiment, data relating to the borrower is stored in a secure centralized database. The processing and management system includes separate graphical user interfaces that provide each member of a brokerage company, i.e., loan officer, processor, and manager, with a unique view of loan data, tailored to their role in the loan origination process and personalized to fit their needs. The single data source, allows for automatic population of loan application forms with current loan information throughout the system, and ensures that each of the parties has access to and works on the latest and most complete version of the loan application. Furthermore, the maintenance of only one true version of every loan in the system facilitates the automation of various functions, such as accurate loan pipeline displays, automated loan tracking with milestones and alert generation, up-to-date contact management, conflict-free inter-party communication and conversation logging, and accurate company-wide business metrics.

System Overview

In one embodiment of the present invention, the loan origination software system and centralized database are executed and maintained on a dedicated server computer that is coupled to one or more computers operated by the loan broker. FIG. 1 illustrates an exemplary network system for processing loan applications, according to one embodiment of the present invention. In system 100, a loan origination and processing server 110 executes an LOS program and maintains a database that stores relevant borrower data, and other data, such as application form templates, government regulation information, lender information, and other mortgage or general loan-related information. The LOS program computer comprises several program modules that manage the loan origination process.

As illustrated in FIG. 1, the server computer 110 executes an LOS program. In an alternative embodiment, each of the loan origination and processing clients 104, 106, and 108 can execute respective LOS programs or portions of an LOS program. The loan origination and processing server 110 maintains a database that stores relevant borrower data, as well as other data pertinent to the loan application process. In this embodiment, the each of the different client entities 104, 106, and 108 within brokerage 102 can execute standalone LOS programs, or different instances (user interface views) of the same or a distributed LOS program. In a further alternative embodiment of the present invention, the loan origination and processing functionality performed by server 110 can be merged into each LOS client 104, 106, and 108. In this case, the maintenance of the database and other data can be performed by any of the LOS clients in the peer-to-peer networking model.

The loan origination and processing server 110 is coupled to a loan broker 102. The loan broker 102 consists of three different functional entities, the brokerage manager 104, loan officer 106, and loan processor 108. Each functional block in system 100 is intended to represent a networked computer that is operated by a respective operator. The loan officer 106 is the primary functional interface with borrowers, such as borrower 112, and some third party services 116. The loan processor 108 provides the main functional interface to loan underwriter 118, and other entities such as financial institution or bank (lender) 114, and many third-party services 116.

The loan officer 106 and processor 108 generally perform the function of initiating, fulfilling and settling the loan application. For example, the loan underwriter 118 reviews the loan application and approves or denies the application. One example of a mortgage loan underwriter is the Fannie Mae company, which does not itself provide loan funds but works with lenders to assure that the funds are available. Lenders 114 are banks, savings and loans, or other financial institutions that provide the loan funds. The settlement service vendors 116 provide services and information required to close the loan. Such vendors include appraisers, credit reporting agencies, document preparers, flood certification agencies, and the like. Other third party entities that may be interfaced to the broker computer may include loan servicers who collect monthly payments from the borrower, and other similar loan process companies.

System 100 includes a network interface that provides access between the loan origination and processing server 110 and other entities. For this embodiment, as illustrated in FIG. 1, the bank 114, third party services 116, and underwriter 118 are coupled to the loan origination and processing server 110. The server 110 then provides the communication link between these entities and the various parties within the loan brokerage 102. In a typical implementation, the network coupling the various computers comprises the Internet, and the interface for each user may be a web-based interface. In this case, each functional block executes a web browser client process.

The client computers within broker 102 can be networked computers coupled together over a LAN, WAN, or similar network system, or they can be connected through the Internet. Furthermore, one or more of the computers can be remote or mobile devices that are only periodically coupled to the brokerage network.

The processing system 100 includes modules that serve to download map files from server 110 to broker client 102, present a loan selection panel (pipeline), and perform the form population of the loan applications on demand. The processing system 100 also allows for downloading of program modules to complete a transaction. For example, a DLL (Data Link Layer) object for a particular credit vendor can be downloaded to the user on request. Other tasks performed by module include performing client-side posts (e.g., HTTPS Post) to submit files to servers, receiving credit reports, presenting a message list for incoming server messages, and centrally tracking transactions on a server.

The processing system illustrated in system 100 can use the Secure Sockets Layer (SSL) protocol when transmitting data between clients and server 110. The transfer of data between clients and server is based on an open and expandable file format with no restriction or limitation on the type or amount of data. As stated above, the client-side of the processing system 100 can be implemented through a Web browser over an Interact link.

Loan Origination System Process

Figure 2:
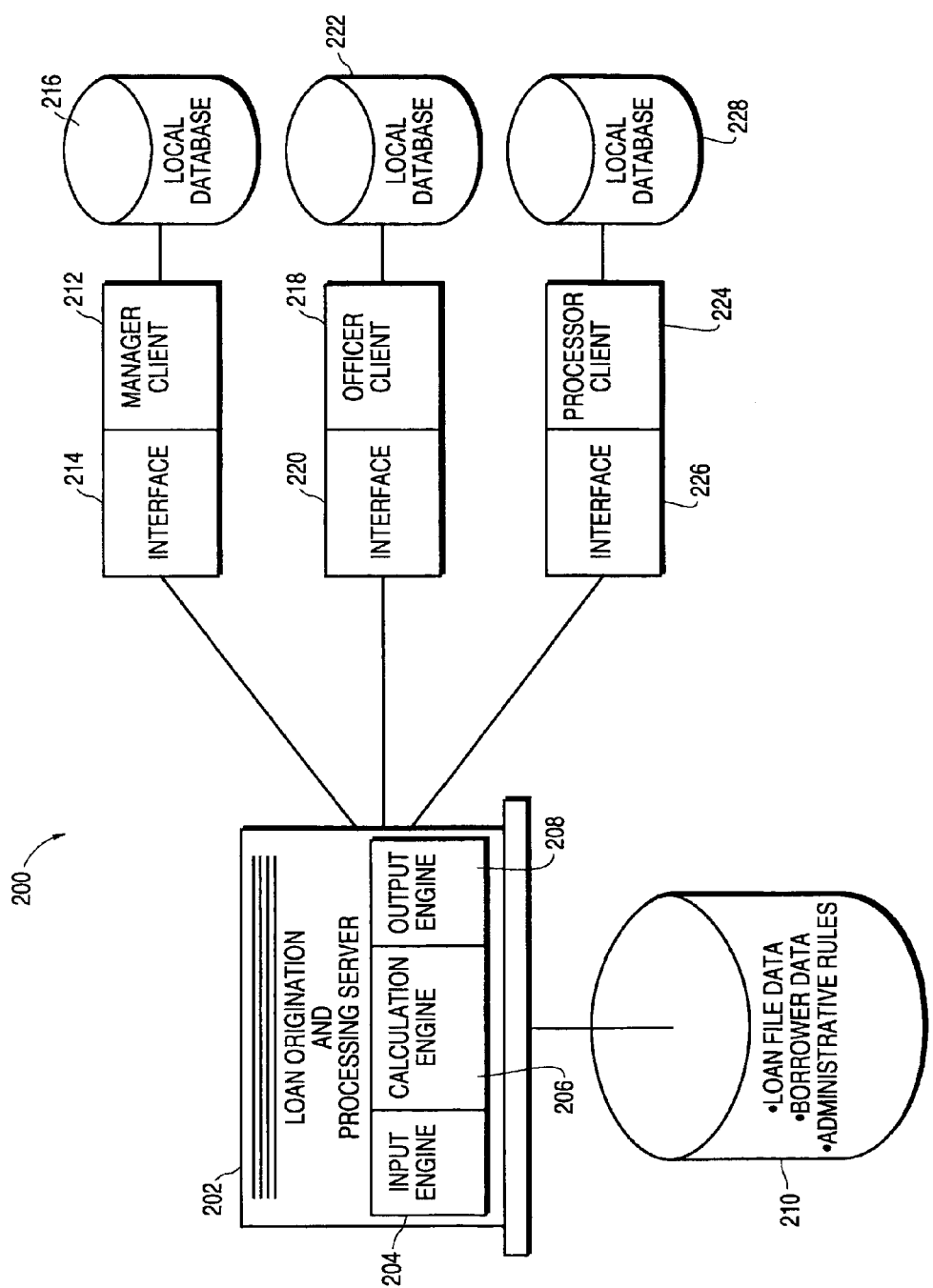
FIG. 2 is a block diagram that illustrates the interface between the loan origination server and the broker entities, according to one embodiment of the present invention.

As illustrated in FIG. 1, the loan origination software system is provided in a central server computer, and the data relating to the borrower is stored in a centralized database. The broker 102 interfaces to the loan origination and processing server 102 through separate physical interfaces for each of the main entities within the brokerage. The processing and management system also includes separate graphical user interfaces that provide each of the loan officer, processor, and manager, with a unique view of loan data, tailored to their role in the loan origination process. FIG. 2 is a block diagram that illustrates the interface between the loan origination server and the broker entities, according to one embodiment of the present invention.

As illustrated in system 200, the loan origination and processing server 202 is coupled to a manager client computer 212 through interface 214, loan officer client computer 218 through interface 220, and loan processor client 224 through interface 226. The loan origination and processing server 202 is also coupled to a database 210, which is the centralized data store for all of the common or shared data related to the one or more loan applications managed by the system. This data can include borrower financial and identification data, loan application data, form templates, governmental rules, administrative rules governing the population of forms, and so on. Data can also be stored locally for each of the broker entities through tightly coupled or resident cache memory, thus, the manager client 212 can maintain a local database 216, loan officer client 218 can maintain local database 222, and loan processor client 224 can maintain local database 228.

The loan origination and processing server 202 executes an LOS program that includes several modules including an input engine 204, a calculation engine 206, and an output engine 208. The input and output engines 204 and 208 control the flow of data and processing instructions between the server 202 and the broker client computers 212, 218, and 224, as well as any other client computers that may be coupled to server 202. The calculation engine consists of processing and program modules within the loan origination program that perform calculations and translate the complex business rule and calculation procedures into non-redundant and non-iterative procedures.

In one embodiment, the processing and submission system illustrated in FIG. 2 includes file templates that are utilized during loan origination. This allows for relevant loan information to be entered only once, and not several times for each different form that uses the same information. An automatic data flow process from the origination screen populates the relevant fields in all of the other loan forms and word processing documents. Forms are supported for several loan types, which include conventional mortgages, FHA (Federal Housing Authority) loans, VA (Veterans Administration) loans, and other types of loans. This automatic data flow eliminates the need to re-enter the same information per form, and also automatically calculates relevant field data, such as interest rates, maximum loan amounts, cash to or from borrower, amortization schedules, and the like.

Once information is entered into each data field, e.g., name and address, of the file template during the loan origination process, the information is saved in database 210, wherein each data field is associated with the particular information entered. In one embodiment, the database may be saved in the data storage facility coupled to or included within the server computer 202. When a particular loan form is activated, the automatic data flow program conducts a search for each data field and inserts the associated information from the database into the correct position located for the data field.

The loan origination system program can be configured to export loan data to different popular formats such as Freddie Mac, Fannie Mac, and Ellie Mac proprietary format. Once the loan data has been exported, it can easily be submitted to the loan officer client computer 218 and from there to other third parties, such as lender 114.

The individual interfaces 214, 220, and 226 within system 200 facilitate the interaction between the broker 102 and the server 110 in a way that maximizes the utility of the system for each separate entity. Loan officers, processors, and broker managers each perform different tasks, and require different instances of loan application information, even though they may each be using the same data.

For example, the highest priority tasks for loan officers is to manage client (borrower) relationships, pre-qualify clients, initiate the loan process, and monitor the pipeline. In contrast, loan processors require tools to process loans, satisfy underwriters and service providers, and keep track of loan application milestones. The broker managers typically require a more general view of the system since they are typically concerned with productivity of the loan officers and processors. Thus, managers require tools that allow the monitoring of the overall pipeline, compiling sales forecasts, compliance with regulatory requirements, and monitoring business provided to particular lenders and third-party service providers.

Figure 3A:
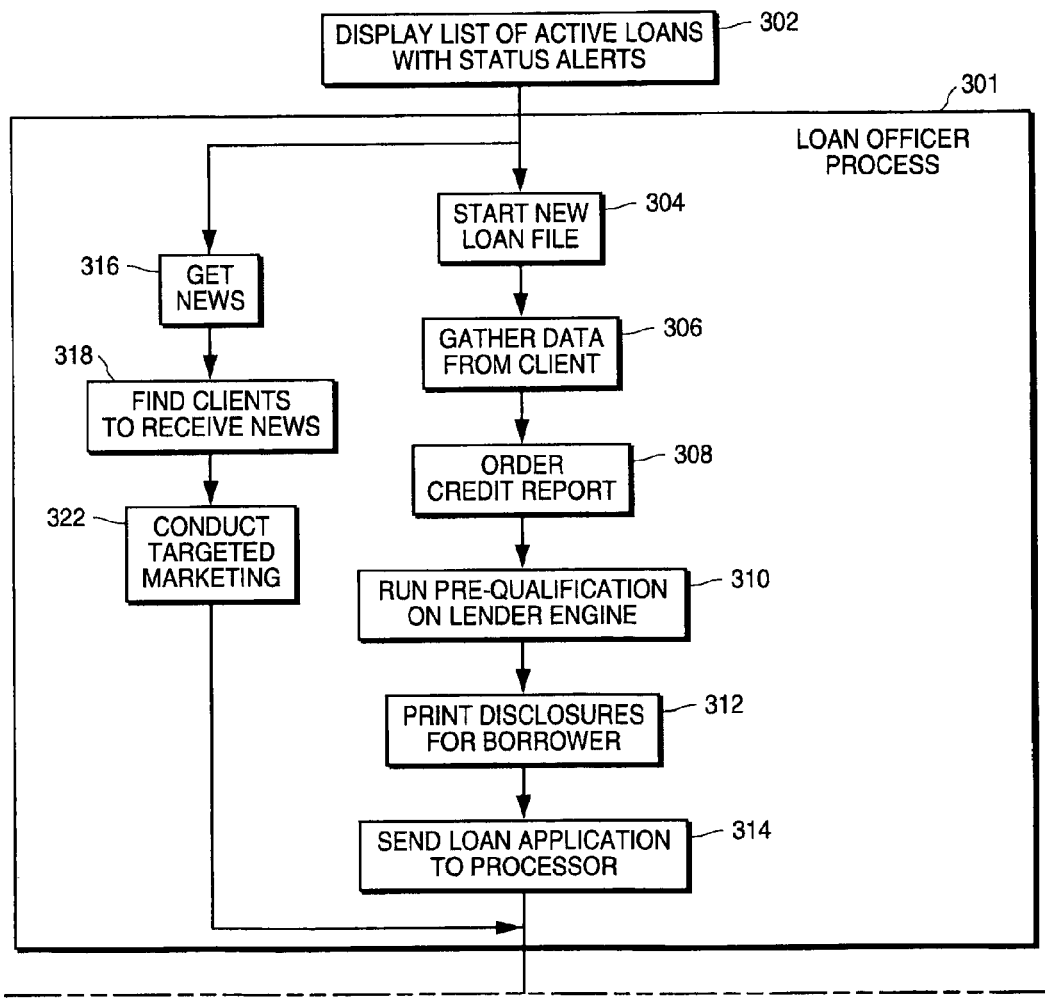
FIG. 3 includes two parts, FIGS. 3A and 3B, and is a flowchart illustrating the steps of processing and submitting a loan application through a loan application processing and submission system, according to one embodiment of the present invention.
Figure 3B:
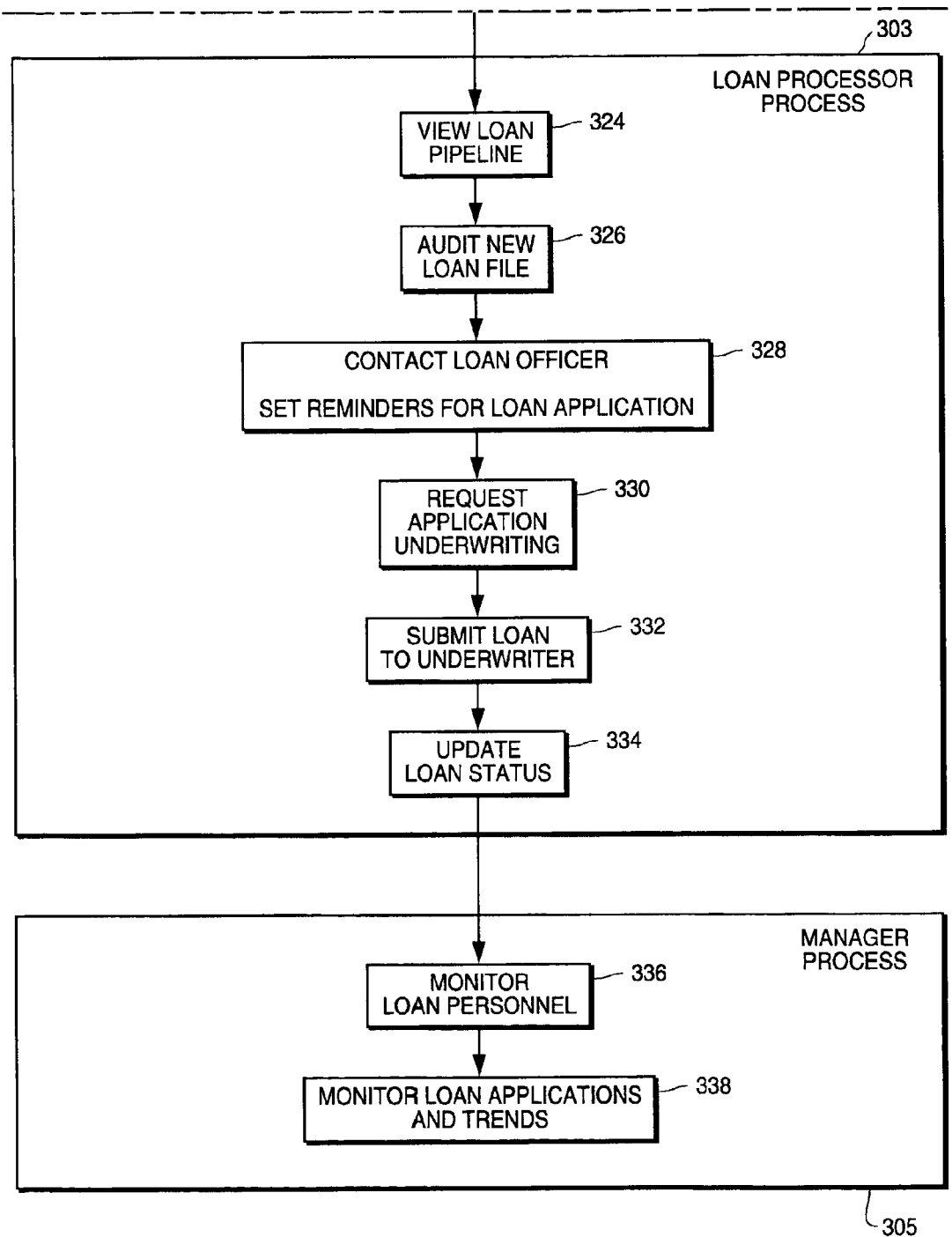

FIG. 3 is a flowchart that illustrates the steps undertaken by the loan broker, processor, and manager for a loan application processed by the system of FIG. 2, according to a method of the present invention. The main processing steps within flow diagram 300 include a loan officer process 301, a processor process 303, and a manager process 305. The loan origination and processing server 110 first causes the display of the loan application pipeline on the appropriate broker computer, step 302. This is typically a list of active loans with specific status information displayed on the loan officer client computer. The loan officer process start with the initiation of a new loan file, step 304. The officer first gathers relevant information from the borrower, step 306. Once initial information is obtained, the loan officer orders a credit report, typically through a third-party credit reporting agency, step 308. Using the borrower's financial information and credit score, the loan officer can attempt to pre-qualify the borrower using a lender process, step 310. In step 312, the loan officer prints and sends the requisite disclosure and preliminary loan application documents to the borrower. The loan application is then ready to be passed on to the loan processor, step 314.

In parallel with actual loan application processing, the loan officer can also perform marketing related tasks, such as obtaining financial news, step 316, passing this news on to particular clients, step 318, and conducting targeted marketing to attract clients to particular loan products, step 322.

Once a loan application is populated with requisite borrower and lender information by the loan officer, it is passed on to a loan processor for further processing. The loan processor begins by viewing the loan pipeline through interface 220, step 324. The processor can select a particular loan application to audit, step 326. In step 328, the processor contacts the loan officer who initiated the loan application and sets reminders for the various milestone events concerning the loan application. Such milestones can include escrow timeline events, inspection dates, closing date, and so on. Once a loan application is sufficiently mature, the processor can request an application underwriting, step 330, and then submit the loan to an underwriter 332. Once the loan is submitted, the loan application status must be updated, step 334.

The current status of all loan applications is stored in database 210 where it can be accessed by the broker manager. In general, the manager process 305 encompasses a variety of high-level tasks related to management of the brokerage. This can include monitor loan personnel with respect to productivity and sales levels, step 336, and the monitoring of loan applications in general to detect and track trends in the mortgage industry, step 338.

As illustrated in the flowchart of FIG. 3, each party within the brokerage 102 fulfills different tasks and performs different process steps during the loan application process. Each party thus makes use of the data 210 in different ways, and requires different types of processing from server 202. The individual interfaces illustrated in FIG. 2 facilitate the flexible interface between each party and the loan origination and processing server 202. Although specific interface embodiments and examples are illustrated for specific parties including loan officers, loan processors, and loan brokers, it should be understood that the described interfaces could be expanded to include, or similar interfaces could also be provided for other parties involved in the loan fulfillment process, such as underwriters, funders, closers, retail financial providers, and similar parties.

Loan Officer Interface

The task of the loan officer is basically to generate leads, market loan products to prospective clients, manage existing client relationships, initiate the loan application process, maintain loan file logs, and monitor the loan pipeline. Interface 220 provides a unique view to the loan origination and processing server 202 for loan officers, provides access to all data in all loan files in the system.

Figure 4:
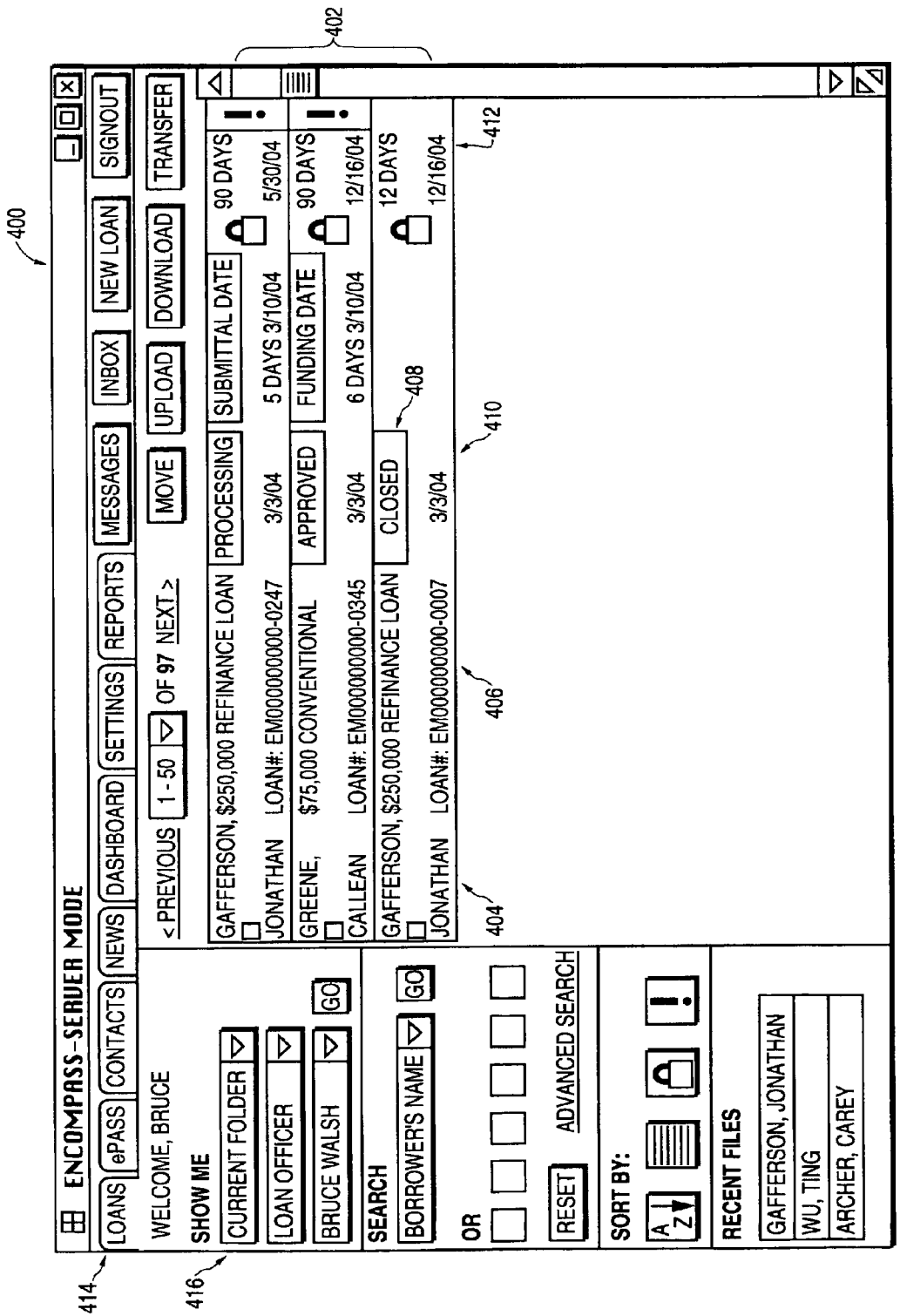
FIG. 4 is an exemplary screen shot of the loan officer interface page, according to one embodiment of the present invention.

The interface facilitates the development and management of borrower relationships while enabling the compiling of data, pre-qualification of client borrowers, and monitoring of the pipeline requiring contact with the loan processor. The interface provides instant status display of any loan, and incorporation of automatic alerts indicates the presence of any issues the loan officer needs to address such as submission of application documents, or rate lock expiration dates. FIG. 4 is an exemplary screen shot of the loan officer interface page, according to one embodiment of the present invention. The loan officer interface page 400 includes a loan pipeline section 402 that displays a list of the currently pending loan applications in the system. The loan applications are organized by borrower name 404 with various entry points for loan information and type 406, pipeline status 408, milestone dates 410 and alerts 412. The alerts section 412 can contain visual flags, such as exclamation points, to alert the viewer to impending action items regarding a loan application.

Within interface screen 400, various control panels allow the user to vary the display or reorganize the loan application data, as well as sort by different parameters. Files and data can be moved, uploaded, downloaded, and transferred to other parties within the system. The relevant pipeline information and data can be organized and displayed using view options, such as shown in dialog boxes 416. These allow pipeline or loan processing activity to be displayed for different personnel in the system or different files in the system. A search feature can also be included, as well as a sort feature.

FIG. 4 illustrates an embodiment of the main pipeline interface for the loan submission and processing system. This interface is implemented in such a way that information displayed within the pipeline is formatted for the user type and that certain functionalities will only be available for certain individuals. For example, the loan officer and the loan processor have different goals and needs. The pipeline interface facilitates those goals and needs by providing easy access to common functions and displaying relevant information. The individual file indicators in the pipeline interface are referred to as "plinths" and are designed to display data that is relevant to the type of user. The plinths have a unique format based on the individual accessing the pipeline. The plinths can be sorted in a number of ways with unique sorting capabilities based on the role of the individual. Certain tools and functionalities are required for use outside the loan file and are made available in the pipeline interface. Access to these tools is based on user profile. For instance, a non-mobile client computer would not need download/upload capabilities, whereas a mobile user may need such a capability.

In one embodiment, the main pipeline display interface shown in screen display 400 includes a tabbed display feature that allows access to other significant tools and interfaces within the loan origination and processing server 110. As shown in FIG. 4, the pipeline interface is accessible under the tab labeled "Loans." Similarly other tools, information, and interfaces can be accessed through the other tabs. For example, the "contacts" tab provides access to an integrated contact manager, the "News" tab provides access to an online news compilation service, the "Settings" tab allows the user to modify certain parameters regarding the organization and presentation of the data within the system, the "Reports" tab provides for the generation of various reports based on the data stored within the system, and the "Dashboard" tab provides for customized viewing of data appropriate to each user based on their role in the organization. Functionality regarding each of these alternate interfaces will be described in greater detail below.

Within the loan officer interface screen 400, detailed information regarding a particular loan application can be accessed or input by selecting a particular loan application in the pipeline 402. FIG. 5 is an exemplary screen shot for a loan application referenced in the interface page of FIG. 4. Selecting the loan application for a particular borrower causes the display of a transaction details window 502. This window provides various user input fields for the entry of data related to the loan and the subject property, as shown. A log window 504 records significant processing steps associated with the loan applications, such as when the file was started, when data was entered, and other steps related to the processing. A forms and tools subwindow 506 provides access to executable modules that cause relevant forms to be generated and printed or transmitted to the client or lender. Relevant loan information and processing personnel information is displayed in the loan application data subwindow 508. The central database 210 allows the production and population of forms thereby eliminating the need for re-entry of data. It also facilitates the efficient printing and distribution of the Truth in Lending, Good Faith Estimate, and other forms to the borrower.

Figure 6:
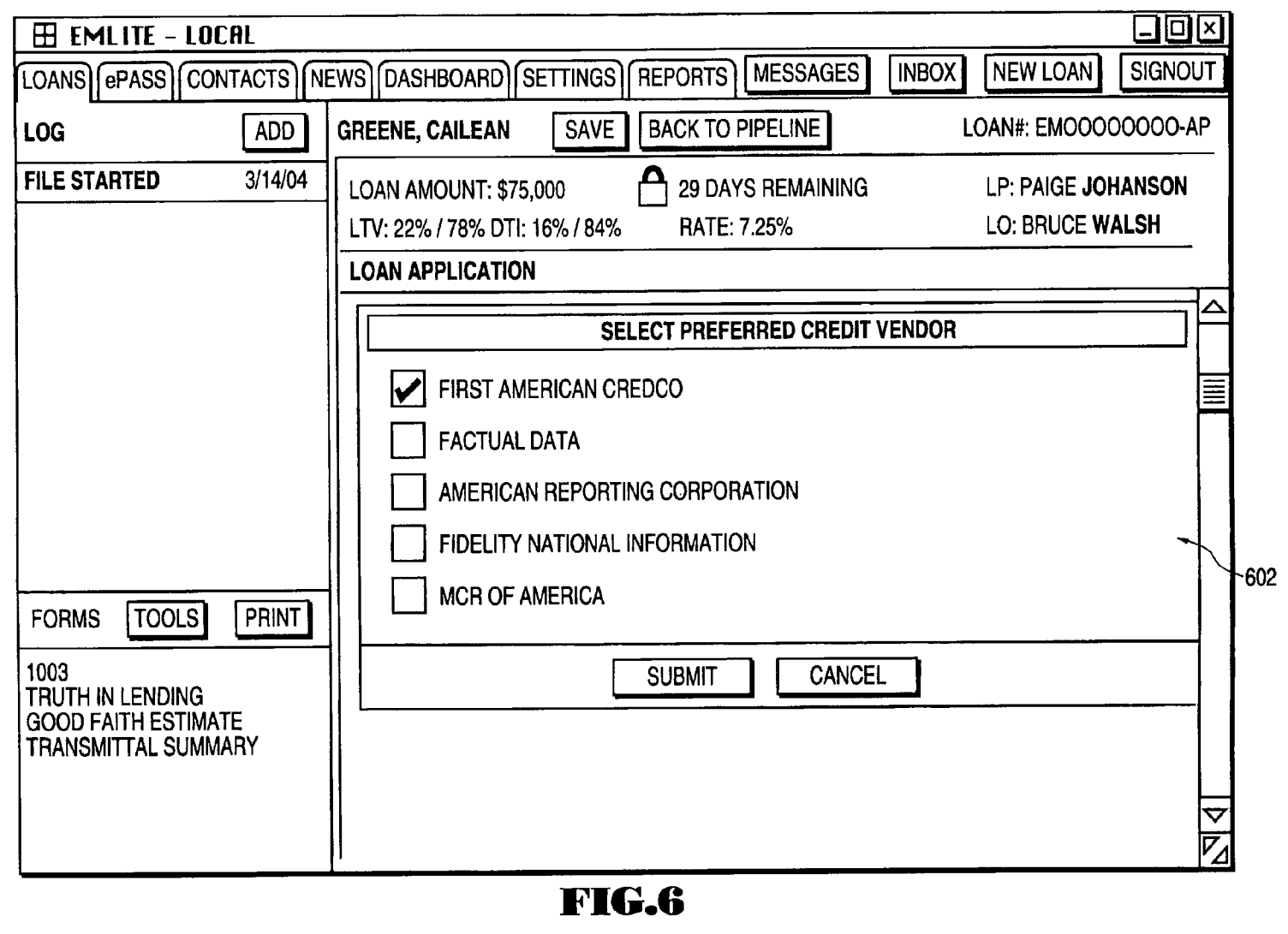
Figure 7:
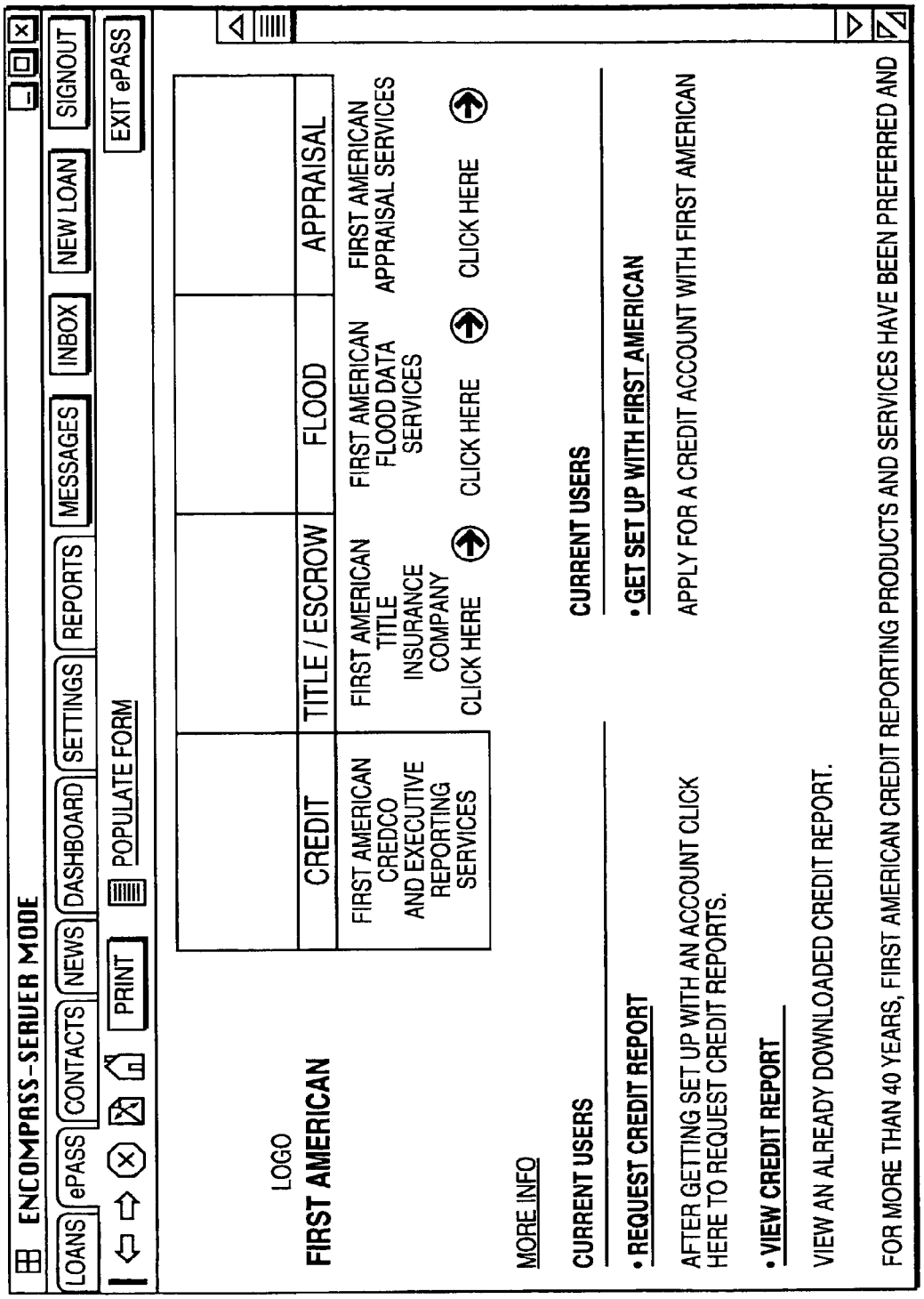
FIG. 7 is an exemplary screen shot for a third party service interface, according to one embodiment of the present invention.
Figure 8:
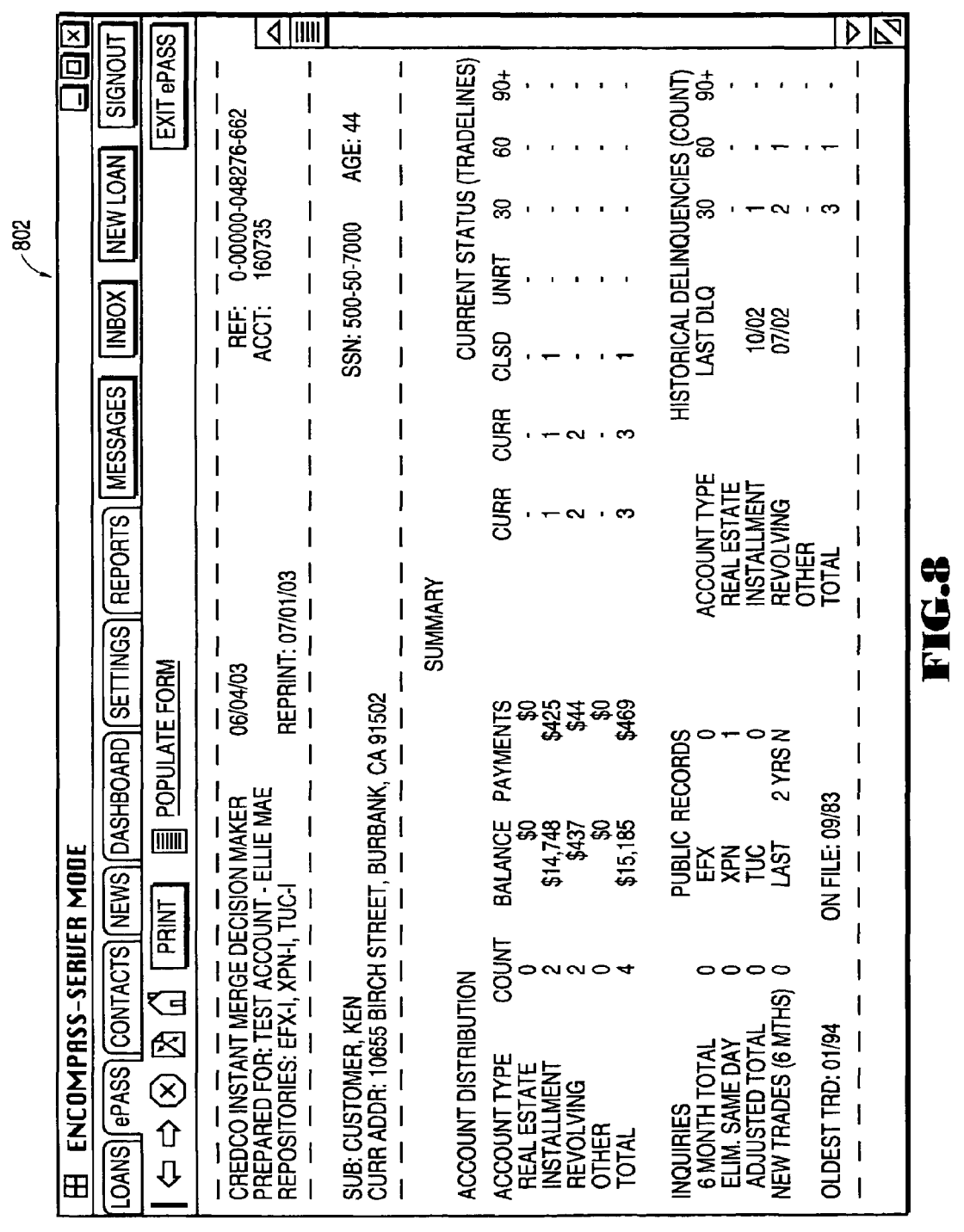

The loan officer 220 interface is also configured to provide direct access to lenders and third party service provides for online ordering of credit reports, prequalifications, and similar external functions. FIG. 6 is an exemplary screen shot for a loan credit report interface, according to one embodiment of the present invention. The loan vendor selection subwindow 602 displays a list of possible sources or vendors of the credit reporting service. Upon submission of the credit report request, relevant data regarding the borrower and the loan is transmitted from the database 210 to the credit reporting agency. Other third party service providers can be accessed in a similar manner. FIG. 7 is an exemplary screen shot for a third party service interface, according to one embodiment of the present invention. Various service providers are displayed for services such as credit reporting, title/escrow, flood data, appraisals, and so on. The services provided by a particular vendor can be displayed, or different services from different vendors can be displayed. The selection of a particular services causes the transmission of relevant data from the database to the third party service provider for further processing. Once the service provider has completed whatever processing task has been requested, result data is transmitted back to the loan origination and processing system. FIG. 8 illustrates an exemplary credit report returned from a credit reporting agency through the loan officer user interface. The data illustrated in screen window 802 is displayed as provided in simple text form by the credit reporting agency. It can be formatted in any manner desired by the user.

The central database facilitates the marketing tasks undertaken by the loan officer. The loan officer can research closed loans to develop targeted marketing for new business generation from existing clients. For example, it is possible to pull a list of all clients whose last loan closed in a particular time period at a particular minimum interest rate. This allows the generation of a targeted marketing message to these clients, announcing a new loan program or lower interest rate. The loan officer interface 220 also includes a full-featured contact manager that provides for prospecting, lead generation, and marketing capabilities.

Loan Processor Interface

Once a loan application is initiated and the borrower is pre-qualified, it is passed to the loan processor. The loan processor is generally responsible for the logistical, management, and communication aspects of the loan application process. The loan processor is often required to keep track of every step of a complex and often changing origination process, by tracking dozens, even hundreds of loans at a time.

In one embodiment of the present invention, the loan process interface 226 provides a unique view to the loan origination and processing server 202 for loan processors and provides seamless text-based communication with loan officers and managers. The interface facilitates the establishment of automated timing alerts and the sorting of loan applications by various different priorities. An automated update feature updates loan status without requiring communication with the loan officer. Checklist verification allows for automatic compliance with government regulations and other pre-defined rules.

FIG. 9 is an exemplary screen shot of the loan processor interface page, according to one embodiment of the present invention. The loan processor interface page 900 includes a loan pipeline section 902 that displays a list of the currently pending loan applications in the system. The loan applications are organized by alert status, with loan applications with current alerts displayed first. This allows the loan processor to quickly view the loan pipeline and the status of each loan application, such as New, Document Signing, Approved, Submitted, Funded, and so on. The alert display indicates whether something urgent needs to be addressed, such as lock rate expiring, missing information, and so on. Such an alert is shown through an exclamation point 904, or similar graphic symbol that catches the user's eye. Through this interface, loan data is automatically pulled from the borrower file stored in database 210 and securely transmit to a designated service provider. The returned data is reported data directly back into the borrowers file, thus eliminating the need for data re-entry.

Figure 10:
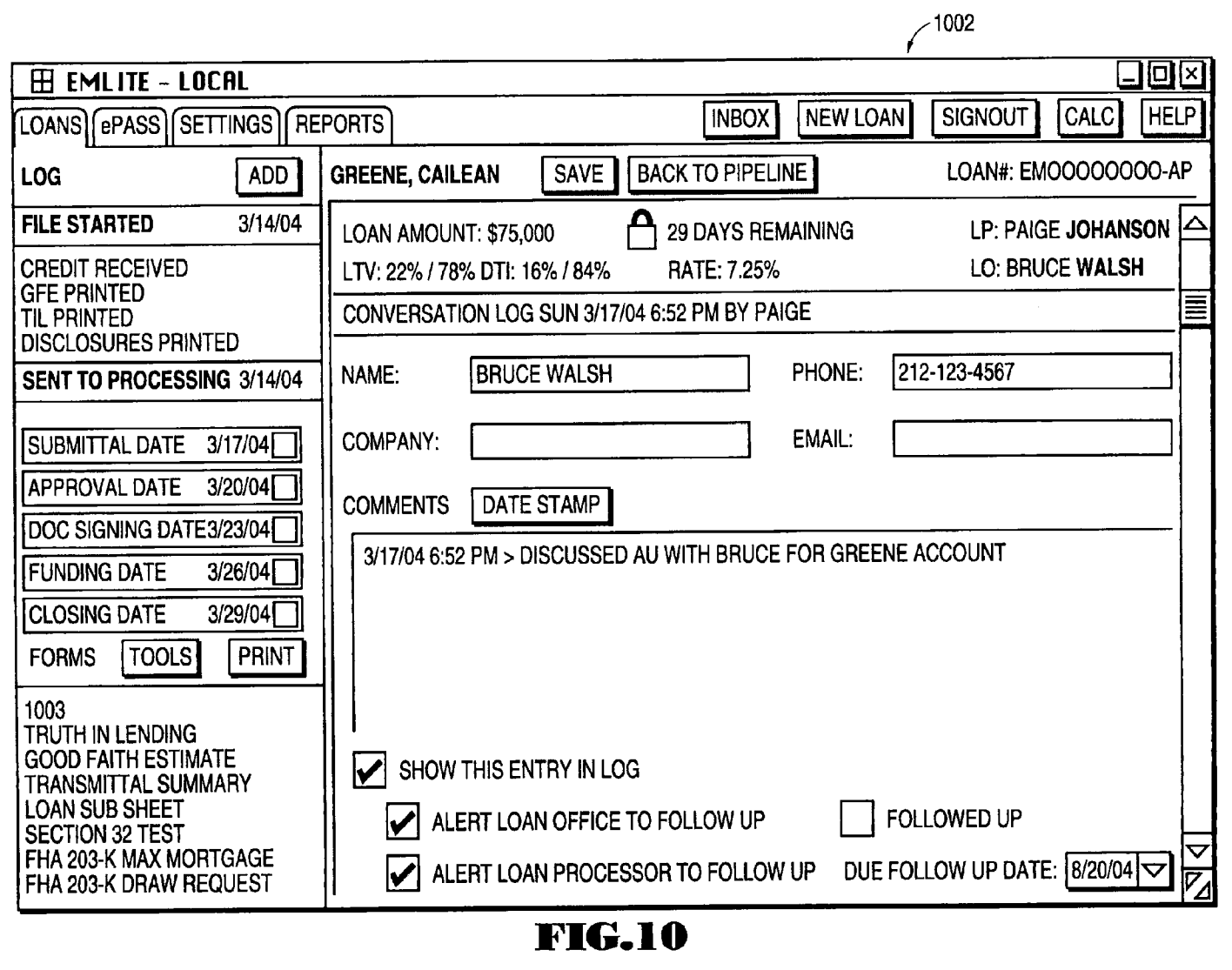

The loan processor interface also includes a communication link and subwindow that facilitates unobtrusive text-based conversations with the loan officer. FIG. 10 is an exemplary screen shot of a text messaging page for the loan processor interface page, according to one embodiment of the present invention. An e-mail text messaging subwindow 1002 allows the user to compose a message to be sent to another user. Conversations and messages can be logged, as illustrated in FIG. 10. Alerts can be set so that when the other user logs onto the system, the message or alert is displayed immediately on their interface. In one embodiment, the conversation log is a tool accessible in the tools pane of the loans interface. The conversation log allows the user to create new communication log entries and view existing conversation log entries. The text-based conversation is displayed in the work area of the loans interface. When a conversation entry is clicked from the log of the loans interface, the conversation log opens in the work area and the clicked entry is highlighted in the list, and details of the conversation are displayed in read only mode.

The processor interface also allows the definition of milestone tasks. These milestones can be customized depending upon the response times of the brokerage and/or the third party service providers.

Once the loan application has been processed by the loan processor, it is sent to an underwriter. FIG. 11 is an exemplary screen shot of a loan underwriting findings report, according to one embodiment of the present invention. Various items of information regarding the underwriting of the loan can be displayed, as shown in FIG. 11.

Loan Broker Interface

In many business scenarios, the overall operations and business of the brokerage firm are overseen by a broker manager or brokerage owner. Embodiments of the present invention take advantage of the common database and interface mechanisms to facilitate the generation of reports to aid the manager in the operation of the brokerage.

The reports functionality can be accessed through the "Reports" tab in the interface screens, such as that shown in FIG. 4. The reports manager interface screen can display pipeline information, similar to that shown in FIG. 4, along with ether options and functions available only to the manager or other personnel authorized by the manager. Because the manager is primarily concerned with reviewing and evaluating data and personnel, the emphasis of functionality in the reports manager is on information organization and presentation, rather than on data processing, as is the case with the loan officer and loan processor interfaces. Thus, the reports manager features report generating functions such as integration with third party spreadsheet and database programs, generation of high level summary charts, detailed tables, summarization of data including aggregated details, management of multiple data elements, and various organizational, search, and sort functions. In general, the reports manager allows for the generation of default or custom reports based on the data stored in the system. Various different parameters can be defined to generate a report such as timeframe (e.g., current week, month, year, last 7 days, last 30 days, last year, and so on), file stage (e.g., opened, submitted, approved, documented, recorded, funded, closed, and so on), loan amount, lender, brokerage personnel, and so on. For example, the manager can generate a "loan processor activity report" from the system for a particular time period, such as current month is selected. Upon generation, the reports generator causes a spreadsheet window to be displayed in the manager interface displaying the relevant activity for the current month. By selecting other time periods or certain activities within that time period, many different reports can be generated for that particular aspect of operations. For example, the data can be organized and displayed to produce a report entitled "Closed Loans for April-June" using the reports manager functionality and the organization of data within the system.

In one embodiment of the present invention, the loan submission and processing system includes a customizable manager graphical user interface, referred to as an "executive dashboard," that provides several graphic views of real-time business information, including activities and trends of loan officers, processors, lenders, and settlement service providers.

The central database architecture illustrated in FIG. 2 provides the ability to provide accurate business metrics in real time. The manager interface 214 encapsulates the loan application information in graphic "snapshots" that can be viewed at a glance. The executive dashboard can be configured to displays a set number of snapshots at a time, while maintaining a greater number, such as twelve or more, business metrics continuously. In embodiment, the dashboard snapshots include a pipeline overview, pipeline trends, loan officer pipeline summary, loan processor pipeline summary, lender overview and trends, third-party overview and trends, purchase-to-refinance trends, loan type trends, referral overview, and commission summary.

In one embodiment, the dashboard functionality can be accessed by selecting the "Dashboard" tab on the main interface screen, such as that shown in FIG. 4. Typically this interface is accessible through both the manager interface 214 and officer interface 220. In general the dashboard provides a view of data and snapshots of events as appropriate to the user based on their role in the organization. For example, the dashboard could provide views of data relating to pipeline progress in the system, the status of loans at each stage of the process, the loan amount (in dollars) processed each month, and so on.

Figure 12:
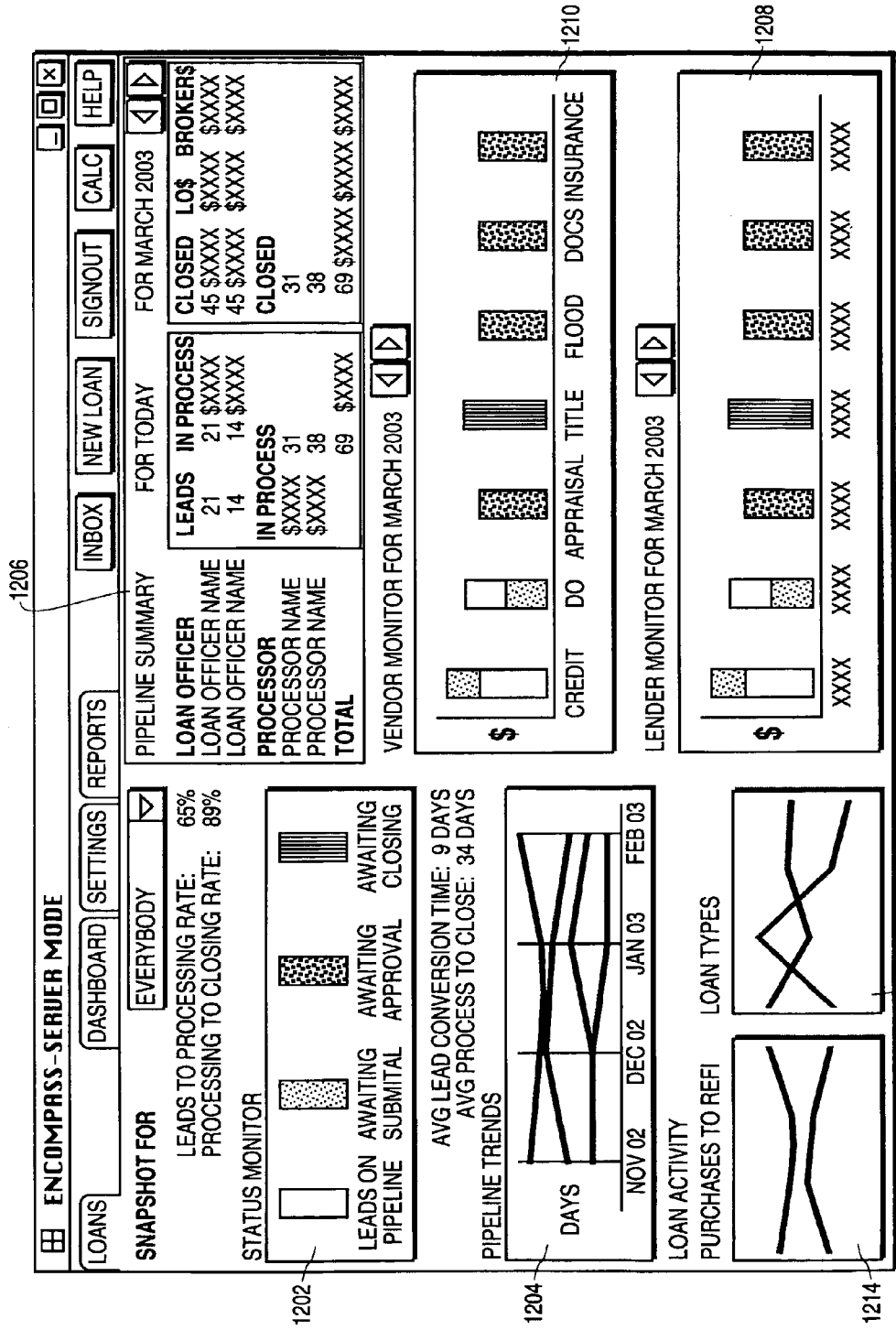
FIG. 12 is an exemplary screen shot of an executive dashboard for the manager interface, according to one embodiment of the present invention.

The manager interface presents a picture of the entire business in graphic form on a single screen, with the data automatically updating in real time. Using this information, it is possible to improve sales forecasting, explore alternate business scenarios, renegotiate key supplier contracts, and manage expansions or contractions through the generation of reports using the reports manager described above. FIG. 12 is an exemplary screen shot of an executive dashboard for the manager interface, according to one embodiment of the present invention. The main manager user interface includes several different subwindows that display graphical objects for various aspects of the brokerage. Window 1202 is a graphical object for the pipeline status. This displays a bar chart of a tally of files or loan dollars represented by files in each of the following stages, total leads not submitted to the loan processor, total leads awaiting submittal to the lender, total leads awaiting approval from the lender, total leads approved by lender and awaiting closing. Window 1204 is a pipeline trend graphical object that graphs the trends within each of the pipeline stages. Trend are shown by creating line graphs containing the average number of days files are staying in each pipeline stage over a pre-specified timeframe. This graph allows the broker manager to spot and address potential pipeline resource problems as they occur. Window 1206 is a pipeline summary graphical object that provides the manager with a dollar summary for each of the loan officers or loan processors as well as an overall summary for all officers and processors. The data is displayed in table format and allows the manager to monitor to the performance of the personnel within the brokerage.

Window 1208 is a lender status graphical object that provides the manager with an overview of loan activity on a lender-by-lender basis. The data is presented in a bar chart format and allows the manager to view the distribution of activity with the lenders and to determine if the brokerage is meeting its contractual obligations. A lender trend graphical user object can also be included, which present a line graph representing different lenders.

Window 1210 is a vendor status graphical object that provides the manager with an overview of loan activity on a vendor-by-vendor basis. The data is presented in a bar chart format and allows the manager to view the distribution of activity with the vendors. A vendor trend graphical user object can also be included, which present a line graph representing different vendors.

Other performance monitoring and loan activity graphical objects can also be provided in the manager user interface. These include a purchase to refinance object 12t4, which provides a quick view of the number of loans that are a result of purchases versus refinances. The data is presented as a line graph and helps the manager identify any trends that might be occurring and that might warrant a change in business strategy. A similar type of graphical object is a loan type object 1216. This provides the manager with an overview of the type of loans that are closing, thus providing insight into the types of loans that are popular and a means to identify changes in customer needs.

In one embodiment of the present invention, the manager user interface includes a snapshot filter. This filter provides a way to change the focus of the executive dashboard to display data for all personnel or specific officers or processors. After a filter is selected, the data within the interface is updated to reflect that subset. This allows the manager to view particular activities or trends related to specific users, and helps the manager optimize the brokerage.

Event Logging

The loan origination and processing server maintains a log, which is a chronological recording of events that have happened or need to happen during the life of the loan application (file). The log is a central, shared interface component that communicates loan status, alerts the user's attention items that need to be addressed, and allows the user to view and gather data based on tracked events. Communications with clients, documents ordered and received, user-defined reminders, and loan application milestones are all tracked within the Log. Documents necessary for facilitation of the loan file are populated into a tracking screen within the user interface when the file is started. Each document type inherits basics, like properties such as "date ordered", "expected in number of days after order", and "expiration date of item after the document has been received". Each property can be set through the administration interface and is inherited by all client computers within the system. The properties are accessible from the tracking screen and if modified, the changes are reflected in the log. This allows the user to manage the tracked documents that appear in the log. Depending upon the interface implementation, each log entry may be a selectable object that allows the user to access and review comments about the entry or to get more detailed information relating to the specific entry. For instance, users who click on the log entry titled 'Credit report ordered' will be able to view the date, time, company ordered from, along with the actual credit report. FIG. 13 is an exemplary log page that lists several different log entries, according to one embodiment of the present invention.

Milestones are loan file status markers that allow the users, typically the loan officer and processor easily understand the current state of a particular loan file. Milestones may include File Started, Sent to Processing, Submitted, Approved, Docs Signed, Loan Funded, and Closed. Other milestones can be defined as well, and can include custom milestones and other events of significance. These milestones reflect events that are present in virtually every loan application, and are listed in the order in which they occur. Once a milestone has been reached, all events tracked from that time forward happen before the next milestone. The log is tracked from start to finish and no future events occur between past milestones and past events do not occur between future milestones. For example, if a user has submitted the loan to a lender and is awaiting approval, all actions taken prior to approval (based on date) would appear in the log between the Submitted and Approved milestones, if after submittal and prior to approval, the user must order appraisal and flood reports, the resulting events in the log fall between the two milestones. Milestones are passive, fluid indicators and should flow 'between' the events in the log; thus representing a snapshot of a moment in time when a significant event happened that pushed the loan into a new phase of processing. All previous and future events are separated by that event.

The log and pipeline features allow the implementation of alert conditions within the pipeline. The user has the ability to set future events to occur and thereby set up reminders when the time to take action draws near. The log alerts the user by means of visual markers provided in both the log and the pipeline interface screens. By default, the interface can be configured so that the pipeline is sorted by loan files that have alerts. For example, as illustrated in FIG. 4, the first two loan application entries, are flagged with an exclamation point (!) indicating that alert conditions exist for those applications. From the pipeline screen, the user can read the alert and open the borrower file to address the alert and reset the status of the alert. Once addressed, the user returns to the pipeline to address the next alert.

The log feature also allows for document and order tracking within the system. Documents are the individual items of data that comprise part of the entire loan application. Documents must be tracked with regard to status to ensure proper handling of the loan application. In one embodiment, a tracking worksheet is provided and populated with the documents necessary for loan file facilitation. For automatic tracking of certain types of transactions, the worksheet is pro-populated with certain types of documents. The tracking worksheet is divided into the two main areas of documents and verifications. Documents are any items or objects that should be tracked during the application process. Verifications are action item objects that indicate whether a desired action has been taken with respect to a document. The loan origination and submission process includes automatic tracking that updates the log and tracking worksheet when the system detects that a service is ordered or a document is received. Such documents include, for example credit reports, appraisals, flood reports, title, and the like. FIG. 14 is an exemplary tracking worksheet that lists several different document and verification entries, according to one embodiment of the present invention.

Alert Processing

In relation to the logging feature of the loan origination and processing system, there are three basic types of alerts. These are rate lock alerts, milestone alerts, and log entry alerts. The log; entry alerts include communication alerts, document alerts, and user-defined alerts. An alert will also be raised for the loan processor when the loan officer sends a loan application to the processor.

The loan officer has the ability within the loan officer interface to specify rate lock information. Interest rate, lock date, lock duration, and calculated expiration date are necessary to facilitate rate lock alerts and display within the pipeline and log. Generally, the loan officer sets rate lock information. The loan processor is allowed to set/modify rate lock data from within the loan processor interface. A rate lock alert is generated when the lock date is reached, the interest rate is reached, the lock duration has elapsed or the calculated expiration date has been reached.

Milestone alerts are driven by the milestone expected date and remain persistent until reviewed by the user. Only future milestones can have alerts associated with them because past milestones have already happened and there is no reason to generate an alert. Milestone data is inherited from administrative settings and applies to each loan application file. Once a file is created, the milestone duration can be changed due to user actions. Milestone alerts are generated for events or action items that are due today or that are past due. Once the milestone has been marked as accomplished, the expected time duration is erased, and the milestone is considered past.

Log entry alerts include three different alert types, communication alerts, document alerts, and user-defined alerts. Log entry alerts are created by direct manipulation of the log elements.

For communication alerts, users have the ability to set follow-up dates for communications initiated through the system. The text displayed in the alert on the pipeline is the text displayed in the log for the entry. Communication log entries become alerts on the day they are due and remain persistent until the user clears the alert. A communication log worksheet can be used setup a follow-up alert within a certain number of days.

Document alerts prompt the user when documents are overdue or about to expire. Once the document has expired, the alert remains until the user has cleared the alert. The user is alerted the day before a document expires. Document alerts are displayed to any user who has the file in their pipeline. Document alerts are displayed when a file is overdue or expired. These are basic alerts that notify the user when a particular document has changed status. Data necessary to generate a document alert includes ID of the user that caused the document to appear in the log, document name, order date, expected date, and expiration date.

User-defined alerts only alert the user who created the alert entry, or another party indicated by the user to receive the alert. User-defined alerts have a limited data set including ID of the user who created the alert, the log entry date, due date of entry, and additional parties to be alerted.

Calculation Engine

As illustrated in FIG. 2, the loan origination and processing server contains a calculation engine component 206. This component represents a core component of the system and is responsible for performing the calculations required by the loan application documents as well as the interfaces themselves. With respect to the loan application data, the calculation engine calculates the various different financial values that are related to the loan application based on the user provided data. The user is typically asked to provide a loan amount, loan term, and down payment amount. Depending upon the locked or estimated interest rate, the calculation engine then calculates monthly payment amounts, cost of loan, and other values that are of interest to the borrower and loan officer. The calculation engine also performs the calculations required for the forms within the system, such as the estimated closing costs, and so on.

With respect to the user interface and the loan origination system itself, the calculation engine performs calculations required by the pipeline, log and alert functions. Once baseline dates are defined within the system, the calculation engine determines and propagates dependent dates throughout the related documents. Thus, for example, escrow closing dates and other milestone dates are automatically calculated and input into the appropriate forms based on initially provided information and pre-defined or user-input administrative rules.

In one embodiment, the calculation engine is a vector-based logical and arithmetic unit that performs calculations on nodes that define different calculation entities. Relationships among the nodes are broken down into a linked list of values that are associated with specific calculation logic. Calculations are performed by executing the arithmetic/logic processes on defined or input variable values.

Contact Management Module

In one embodiment of the present invention, the loan origination and processing system includes a comprehensive contact manager module. This module is primarily provided in the loan officer interface, and enables the loan officer to manage relationships with clients and business contacts. Through the contact manager, the loan officer can send personalized communications through various media, such as e-mail and fax. The contact manager also includes a history database that stores data relating to contacts initiated through the system. This allows the loan officer to view past events and schedule future activities, such as calls, meetings, or action items. The contact management module can be coupled to a separate calendar function that automatically populates an online calendar or appointment manager with the relevant scheduled information.

In one embodiment, the contact manager is closely controlled or "owned" by the loan officer. No other party can directly edit or read the loan officer's contacts. When the loan officer starts an application with a contact all relevant information is copied to the application. As the application is processed or the contact data is changed, this information is kept synchronized. When the loan officer sends an application to processing, the contact is sent but not accessible or readable by the loan processor. The loan processor cannot update the loan officer's contact record until the loan is either closed or defined as inactive. At this time, the contact information is sent back to the loan officer, who can then automatically update the contact record or decline. In addition, key relevant loan information will be copied to the record as read only for purposes of searches in the future. Finally, the loan officer can update the mailing address in the contact with the new property address from the loan.

The format of the contact information can be the name or other identifier associate with the contact along with any and all relevant information, such as address, e-mail address, phone, fax, cell phone number, and so on. In addition, certain personal information can also be included, such as marital status, birthdate, anniversary date, and so on. This information can be used to trigger follow-up correspondence or actions, such as sending a greeting card on a certain personal occasion. The contact information is stored in a contact directory, and is accessed through a contact manager interface within the system.

Figure 17:
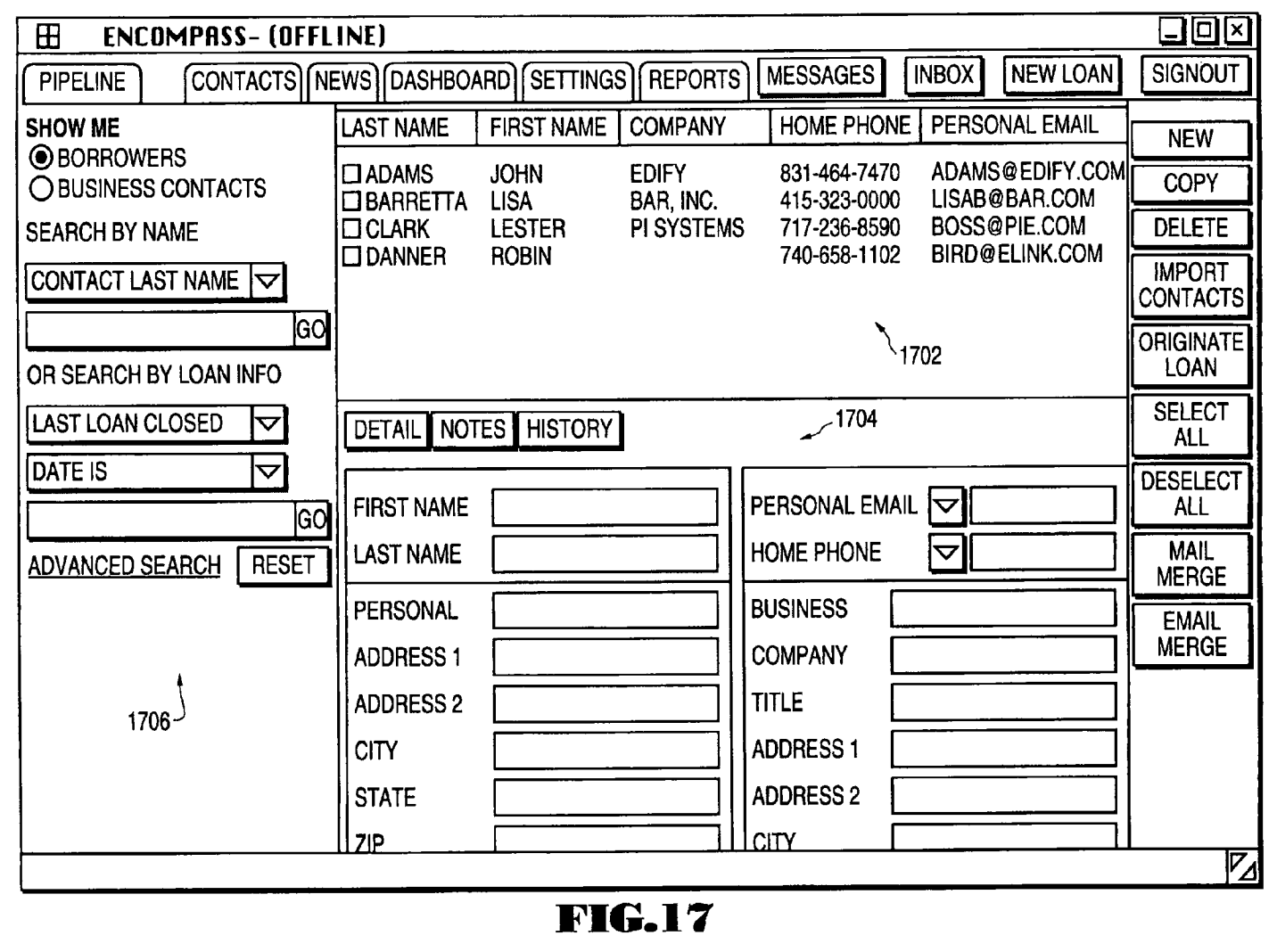

FIG. 17 is an illustrative screenshot of the contact manager interface screen, according to one embodiment of the present invention. This interface screen can be accessed by selecting the "Contacts" tab in the main interface screen, such as that shown in FIG. 4. As illustrated in FIG. 17, the contact manager interface screen includes a display window 1702 that lists (alphabetically or other order) the entries contained in the user's contact directory. Relevant data for the listed contacts is also displayed depending on the space permitting, such as company, phone number, e-mail address, and so on. Various command buttons can also be provided that allows the user to create, delete, and otherwise manipulate the contacts stored in the contact directory. To create or edit information for each contact entry, the contact manager interface includes a subwindow 1704 that contains various entry fields. These allow the user to enter or import data for each of the relevant information fields associated with each contact. The contact manager interface can also include a data organization feature 1706 that allows the user to search or sort the contact data stored in the contact directory.

Because the loan origination and processing system comprises a distributed network that links the loan brokerage personnel with various outside entities, a business contact can be defined within the contact management process. A business contact can be created by any user, and contacts for shared business partners will be configured by the administrator. New business partners are thus defined at the outset as being either shared or private. If shared they are accessible by all users, and if marked as private they are only accessible by the creator. The system can also include a module for importing or exporting contact data to and from other computerized contact programs.

The contact manager allows for the history of contacts for a particular client or business partner to be stored and tracked. The history log for contacts includes the date of first contact, and any subsequent communications that are logged by the system. For a borrower, this can include any communications regarding the loan application such as any communications that are initiated to the client prior to contact being moved to application status. All communications during a loan will be tracked in the log file for the loan. Actions that are logged for a contact client include mail merge, email marketing, e-mail message, faxes, phone calls, and meetings. FIG. 15 is a table that lists the events that are included within a history for client contacts.

News Interface

Figure 16:
FIG. 16 is an exemplary screen shot of a news interface page, according to one embodiment of the present invention.

The loan origination and processing system can also include a news interface for providing news, reports, updates, customized message, advertisements, and the like to the users of the system including brokers, processors, underwriters, managers, service vendors, and so on. The news items can be compiled by the operator of the loan origination and processing server 110, and can include relevant news items or messages related to the loan market, financial market, products or services provided by the server operator, and so on. This interface can also be used to convey important information to the system users, such as the availability of product or service enhancements and updates (e.g., software patches, new features, etc.). It can also be used to provide reports regarding market trends, specific product performance, and similar data. FIG. 16 is an exemplary screen shot of a news interface page, according to one embodiment of the present invention. This screen is made available from a web server process on server 110 and can be accessed through the web browser processes on the broker, processor, and/or loan officer client computers, as well as any other networked client computer. As illustrated in the main display window 1600, the news interface screen includes sub-display area 1602 for specific news items, such as those related to specific products or services, and those related to the mortgage and financial industries in general. Also provided are subwindows 1604 and 1606 for the display of market reports and analysis, as well as any advertisements or messages from sponsors, affiliates, or other third parties.

It should be noted that the web pages illustrated in FIGS. 4-17 are primarily intended for illustration, and that the layout and content of the web pages served by the systems 100 and 200 can vary depending upon implementation choices by the lenders and/or loan originators. Furthermore, a wide variety of web pages can be provided for other aspects of the loan application process and the links illustrated in the Figures.

Although embodiments of the present invention have been described with reference to a network implementation comprising the Internet and Interact-related web browsing and web serving technologies, it should be noted that alternative embodiments of the present invention can be implemented on many other types of networks and network protocols, such as proprietary protocols for local area networks, wide area networks, and any combination thereof.

The present invention has been described primarily in relation to loan applications for personal home mortgage loans. It should be noted, however, that many other types of loans can be processed through the embodiments described herein, such as commercial loans, any type of personal loan, home equity loans, and the like.

In the foregoing, a system has been described for processing and submitting loan applications through an embedded loan origination software system and loan processing interface system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A loan origination system comprising:
a loan origination program;
a database stored in a memory device coupled to a server computer, the database storing borrower data and loan data; and
one or more computers configured to provide:
a processing and management system configured to present a plurality of user interfaces corresponding to a plurality of user roles, each user interface being customized for presentation to a user based on a role of the user wherein users with different user roles are presented with different user interfaces, the user roles being selected from a group including an officer, a processor, or a manager;
a milestone process defining one or more milestones associated with processing each loan application and configured to evaluate progress of users associated with user roles as against the one or more milestones wherein the milestones are ordered and include one or more of file started, sent to processing, submitted, approved, docs signed, loan funded and closed;
a logging process monitoring and recording events in a log that have or need to occur between respective milestones; and
an alert process defining one or more alert conditions associated with processing each loan application wherein the alerts include a rate lock alert, milestone alerts and log entry alerts, wherein a respective user interface displays an alert graphical icon indicating an impending deadline upon triggering of an alert condition as a result of an imminent rate lock, milestone or log entry that has yet to be completed.

2. The system of claim 1 wherein the logging process logging milestone events associated with the loan application and logging communications between an officer client computer, a processor client computer and a manager client computer.

3. The system of claim 2 wherein the logging process further logs communications among users of the system and document ordering and receiving status.

4. The system of claim 2 further comprising a contact management process that organizes borrower data used by the officer client computer and automatically generates marketing correspondence.

5. The system of claim 1 wherein the plurality of user roles include a loan officer role and a loan processor role, wherein one of the plurality of user interfaces includes a manager interface, and wherein the manager interface includes a module that compiles and displays statistical data relating to performance metrics associated with the loan officer role and the loan processor role.

6. The system of claim 1 wherein one of the plurality of user interfaces includes a manager interface, and wherein the manager interface includes a module that compiles and displays statistical data relating to performance metrics associated with one or more lenders.

7. The system of claim 1 wherein one of the plurality of user interfaces includes a manager interface, and wherein the manager interface includes a module that compiles and displays statistical data relating to performance metrics associated with one or more third-party service providers.

8. The system of claim 1 wherein one of the plurality of user interfaces includes a manager interface, and wherein the manager interface includes a module that compiles news items relating to services provided by the system.

9. The system of claim 1 where one of the plurality of user interfaces includes an officer user interface executed by an officer client computer, the officer user interface being configured to connect the officer client computer to one or more partner computers including at least one of a lender computer or a settlement service vendor computer.

10. The system of claim 1 where one of the plurality of user interfaces includes a processor user interface executed by a processor client computer, the processor user interface being configured to connect the processor client computer to an underwriter company computer.

11. The system of claim 1 wherein the processing and management system is connected to a web-based interface system, the web-based interface system being configured to provide the plurality of user interfaces.

12. The system of claim 1 wherein the loan origination program is operable to display online forms comprising the loan application and populate the borrower data in appropriate locations of the online forms.

13. The system of claim 12 wherein the database further stores administrative rules dictating formatting and population of data within the online forms.

14. The system of claim 1 wherein one of the plurality of user interfaces includes an officer user interface executed by an officer client computer, wherein one or more online forms are packaged into a loan application, and wherein a plurality of different loan applications for different borrowers are displayed in a list format on the officer client computer through the officer user interface.

15. A loan origination system comprising:
one or more computers configured to provide a processing and management system, the processing and management system configured to present a plurality of user interfaces in association with processing loans, each user interface being customized for presentation to a user based on a role of the user, wherein users with different user roles are presented with different user interfaces and wherein the different roles are selected from the group of loan officer, loan processor or manager, wherein the processing and management system is configured to execute a milestone process defining one or more milestones associated with processing each loan application and configured to evaluate progress of users associated with user roles as against the one or more milestones, wherein the milestones are ordered and include one or more of file started, sent to processing, submitted, approved, docs signed, loan funded and closed, wherein the processing and management system is configured to execute a logging process monitoring and recording events in a log that have or need to occur between respective milestones, wherein the processing management system is configured to execute an alert process defining one or more alert conditions associated with processing each loan application wherein the alerts include a rate lock alert, milestone alerts and log entry alerts, wherein a respective user interface displays an alert graphical icon indicating an impending deadline upon triggering of an alert condition as a result of an imminent rate lock, milestone or log entry that has yet to be completed for a given loan application; and
a server computer coupled to the processing and management system, the server computer storing a database including borrower data and loan data, wherein the server computer includes an interface to one or more partner computers including at least one of a lender computer, a settlement service vendor computer, or an underwriter company computer.

16. The system of claim 15 wherein each user interface is configured to be executed on an associated computer, each computer including a database management module providing management control of data stored in the database.

17. The system of claim 16 wherein the data is stored in one or more data storage units remotely coupled to the processing and management system.

18. The system of claim 15 wherein the processing and management system is configured to execute a loan application process that monitors progress of a loan application by the user roles.

19. The system of claim 15 wherein the processing and management system is configured to execute a loan application process that logs one or more processing events of a loan application processed by the user roles.

20. The system of claim 15 wherein the processing and management system sets one or more events for one or more loan applications associated with the loan data, at least one event indicating a request to transfer processing of a loan application between users with different user roles.

21. The system of claim 15 wherein one of the plurality of user interfaces provides one or more graphic views of real-time business information to a user.

22. A non-transitory computer-readable medium having instructions stored thereon, which, when executed by a processor, causes the processor to perform the operations of:
providing a plurality of user interfaces;
determining a role of a user including selecting the role from a group including at least one of a loan officer, a loan processor, or a loan manager;
customizing one of the plurality user interfaces for presentation to the user based on the determined role of the user;
executing a milestone process defining one or more milestones associated with processing each loan application and configured to evaluate progress of users associated with user roles as against the one or more milestones, wherein the milestones are ordered and include one or more of file started, sent to processing, submitted, approved, docs signed, loan funded and closed;

executing a logging process monitoring and recording events in a log that have or need to occur between respective milestones;

executing an alert process defining one or more alert conditions associated with processing each loan application wherein the alerts include a rate lock alert, milestone alerts and log entry alerts, wherein a respective user interface displays an alert graphical icon indicating an impending deadline upon triggering of an alert condition as a result of an imminent rate lock, milestone or log entry that has yet to be completed; and presenting the customized user interface to the user.

23. The non-transitory computer-readable medium of claim 22, where customizing one of the plurality user interfaces for presentation to the user includes:

determining one or more presentation criteria associated with the user role; and customizing the one of the plurality user interfaces based on the one or more presentation criteria.

24. The non-transitory computer-readable medium of claim 23, where determining one or more presentation criteria associated with the user role includes determining a manner in which borrower data or loan data is to be presented based on the role of the user.

* * * * *